(12) United States Patent
Tsujii et al.

(10) Patent No.: US 9,193,409 B2
(45) Date of Patent: Nov. 24, 2015

(54) SADDLE RIDING TYPE VEHICLE

(75) Inventors: Eiichirou Tsujii, Shizuoka (JP);
Kazuhiro Nishida, Shizuoka (JP);
Masayuki Hirano, Shizuoka (JP);
Toshio Takeuchi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 751 days.

(21) Appl. No.: 12/860,948

(22) Filed: Aug. 23, 2010

(65) Prior Publication Data
US 2011/0060494 A1    Mar. 10, 2011

(30) Foreign Application Priority Data
Sep. 8, 2009   (JP) ................................. 2009-206910

(51) Int. Cl.
| B62K 5/10 | (2013.01) |
| B60G 21/10 | (2006.01) |
| B62K 5/01 | (2013.01) |
| B62K 5/00 | (2013.01) |

(52) U.S. Cl.
CPC .............. *B62K 5/10* (2013.01); *B60G 21/106* (2013.01); *B62K 5/01* (2013.01); *B60G 2200/46* (2013.01); *B60G 2204/46* (2013.01); *B60G 2300/124* (2013.01); *B60G 2300/45* (2013.01); *B60G 2400/204* (2013.01); *B62K 2005/001* (2013.01)

(58) Field of Classification Search
None
See application file for complete search history.

(56) References Cited

U.S. PATENT DOCUMENTS

| 5,513,832 A | * | 5/1996 | Becker et al. ............ 251/129.18 |
| 7,343,997 B1 | | 3/2008 | Matthies |
| 2007/0262549 A1 | | 11/2007 | Haerr et al. |

FOREIGN PATENT DOCUMENTS

| EP | 1 561 612 A1 | | 8/2005 |
| EP | 1561612 | * | 10/2005 |
| EP | 1 666 346 A1 | | 6/2006 |
| EP | 2 151 367 A1 | | 2/2010 |
| JP | 2003-341577 A | | 12/2003 |
| JP | 2004-131027 A | | 4/2004 |

OTHER PUBLICATIONS

Official Communication issued in corresponding European Patent Application No. 10175590.8, mailed on Dec. 21, 2010.

* cited by examiner

*Primary Examiner* — Ryan Zeender
*Assistant Examiner* — Denisse Ortiz Roman
(74) *Attorney, Agent, or Firm* — Keating and Bennett, LLP

(57) ABSTRACT

A saddle riding type vehicle includes a stabilizer arranged to support a pair of wheels arranged at opposite sides of a vehicle body to be movable up and down relative to the vehicle body, and a switching mechanism arranged to switch between a movable state in which the pair of wheels are permitted to move up and down and a locked state in which the pair of wheels are restricted from moving up and down. The switching mechanism includes a coupling pin member arranged to engage with the stabilizer to set the stabilizer to the locked state thereby restricting rotation of the stabilizer relative to the vehicle body, and to disengage from the stabilizer to set the stabilizer to the movable state thereby permitting rotation of the stabilizer relative to the vehicle body, and a solenoid fixed to the vehicle body and arranged to drive the coupling pin member into and out of engagement with the stabilizer. When the switching mechanism switches to the locked state, the vehicle can be parked and stored conveniently with the vehicle body standing unassisted.

17 Claims, 17 Drawing Sheets

SADDLE RIDING TYPE VEHICLE

BACKGROUND OF THE INVENTION

1. Field of the Invention

The present invention relates to a saddle riding type vehicle such as a three-wheeled or four-wheeled automotive vehicle including a pair of wheels at least at the front or rear portion of a vehicle body, which can make turns by leaning the vehicle body.

2. Description of the Related Art

A saddle riding type vehicle has heretofore been disclosed that has a pair of wheels located at opposite sides of the vehicle body at the front portion and/or rear portion of the vehicle body, and can make turns by leaning the vehicle body. Further, a saddle riding type vehicle has also been disclosed that has a mechanism for limiting the leaning of the vehicle body, whereby the vehicle body can stand unassisted, as disclosed in Japanese Unexamined Patent Publication No. 2003-341577 and Japanese Unexamined Patent Publication No. 2004-131027.

Japanese Unexamined Patent Publication No. 2003-341577 discloses a three-wheeled automotive vehicle having one front wheel and two rear wheels. The three-wheeled automotive vehicle has a vehicle body divided into a front vehicle body which supports the front wheel, and a rear vehicle body which supports the pair of rear wheels. The front and rear vehicle bodies are connected to be rotatable relative to each other about an axis extending longitudinally of the vehicle. This three-wheeled automotive vehicle includes a swing lock mechanism for restricting the relative rotation of the front vehicle body and rear vehicle body by using power of a hydraulic disk brake mechanism at a time of braking operation. With this swing lock mechanism, when a braking operation is carried out, the relative rotation of the front vehicle body and rear vehicle body is restricted with predetermined timing, whereby the vehicle body stands unassisted. When no braking operation is carried out, the relative rotation of the front vehicle body and rear vehicle body is permitted, whereby the vehicle body can be leaned.

Japanese Unexamined Patent Publication No. 2004-131027 discloses a three-wheeled automotive vehicle having one front wheel and two rear wheels. The three-wheeled automotive vehicle has a vehicle body divided into a front vehicle body which supports the front wheel, and a rear vehicle body which supports the pair of rear wheels. The front and rear vehicle bodies are connected to be rotatable relative to each other about an axis extending longitudinally of the vehicle. This three-wheeled automotive vehicle includes a lock mechanism for restricting the relative rotation of the front vehicle body and rear vehicle body by electromagnetic force. The lock mechanism includes an electromagnet formed integral with the front vehicle body, an electromagnetic plate formed integral with the rear vehicle body, and a switch for electrifying the electromagnet. When the electromagnet is electrified by operating the switch, the electromagnet is attracted into contact with the electromagnetic plate, which restricts the relative rotation of the front vehicle body and rear vehicle body, whereby the vehicle body stands unassisted. When the electromagnet is de-electrified by operating the switch, the relative rotation of the front vehicle body and rear vehicle body is permitted, whereby the vehicle body can be leaned.

However, the conventional vehicles with such constructions have the following drawbacks.

The vehicle described in Japanese Unexamined Patent Publication No. 2003-341577, for example, does not restrict the relative rotation of the front vehicle body and rear vehicle body when no braking operation is carried out by the rider. It is therefore difficult to park or store the vehicle with the vehicle body standing unassisted according to Japanese Unexamined Patent Publication No. 2003-341577.

With the vehicle described in Japanese Unexamined Patent Publication No. 2004-131027, the frictional force of the electromagnet and electromagnetic plate lowers easily with progress of time, and it is difficult for the lock mechanism to continue restricting the relative rotation of the front vehicle body and rear vehicle body over a relatively long period of time. It is therefore difficult to park or store also the vehicle with the vehicle body standing unassisted according to Japanese Unexamined Patent Publication No. 2004-131027.

SUMMARY OF THE INVENTION

In view of the state of the art described above, preferred embodiments of the present invention provide a saddle riding type vehicle which can be parked or stored conveniently in a state of restricting the leaning of a vehicle body.

According to a preferred embodiment of the present invention, a saddle riding type vehicle capable of making turns by leaning a vehicle body includes a support mechanism arranged to support at least a pair of wheels provided at opposite sides of the vehicle body to be movable up and down relative to the vehicle body; a switching mechanism arranged to switch between a movable state in which the pair of wheels are permitted to move up and down and a locked state in which the pair of wheels are restricted from moving up and down; and a controller arranged and programmed to control the switching mechanism; wherein the switching mechanism includes a coupling pin member arranged to engage with the support mechanism to restrict movement of the support mechanism relative to the vehicle body thereby setting the locked state, and to disengage from the support mechanism to permit movement of the support mechanism relative to the vehicle body thereby setting the movable state; and a solenoid fixed to the vehicle body and arranged to drive the coupling pin member to engage with and disengage from the support mechanism.

The saddle riding type vehicle according to a preferred embodiment of the present invention includes the support mechanism arranged to support a pair of wheels to be movable up and down relative to the vehicle body. When the switching mechanism switches to the movable state, the vehicle body can lean with the pair of wheels to contact a traveling surface. When the switching mechanism switches to the locked state, the vehicle body can stand unassisted.

The switching mechanism preferably includes the coupling pin member and the solenoid, and sets the locked state with the coupling pin member engaged with the support mechanism to thereby conveniently maintain the locked state. Consequently, the vehicle can be parked or stored conveniently with the vehicle body standing unassisted.

Herein, the "saddle riding type vehicle" includes a motorcycle, an ATV (all-terrain vehicle), a snowmobile, or the like. A motorcycle includes a scooter and a moped, for example. The "saddle riding type vehicle" includes, besides a vehicle on which the rider is seated in a state straddling the vehicle, a vehicle driven by the rider seated with his or her legs close together. The "vehicle body" refers to a main frame and the components integral therewith.

According to a preferred embodiment of the present invention, the vehicle further includes a seating detecting device arranged to detect a rider seated on a seat; and a state control unit arranged to receive commands designating the locked state and the movable state from the rider; wherein the controller is arranged and programmed, when it is determined based on a detection result from the seating detecting device that the rider is absent from the seat, to withhold a control causing the switching mechanism to switch to the movable state even if a command designating the movable state is inputted from the state control unit. With the state control unit, an operation by the rider can switch between the locked state and the movable state. When the rider is not seated, the operator does not carry out a control to switch to the movable state even if the state control unit accepts a command designating the movable state, and the state control unit provides this command to the controller. This can relieve the rider of a burden of supporting the vehicle body before the rider is seated.

In a preferred embodiment of the present invention, it is preferred that the controller is arranged and programmed, when it is determined based on the detection result from the seating detecting device that the rider is absent from the seat, to control the switching mechanism to switch to the locked state regardless of a command inputted from the state control unit. With this construction, when the rider is not seated, the locked state is set, that is, the up-and-down motion of the pair of wheels is restricted. Consequently, when the rider is not seated, the vehicle body can be set to the state of standing unassisted.

In a preferred embodiment of the present invention, it is preferred that the vehicle further includes a state detecting device arranged to detect which of the locked state and the movable state has been set; and a shift detecting device arranged to detect whether a shift position of a speed changer is in a drive range; wherein the controller is arranged and programmed to carry out a stop control to stop an engine when it is determined based on detection results from the state detecting device and the shift detecting device that the locked state has been set and the shift position is in the drive range. This can conveniently prevent the saddle riding type vehicle from starting or moving forward while the locked state is maintained.

In a preferred embodiment of the present invention, it is preferred that the stop control cuts off an ignition electric system for the engine. Then, the controller can conveniently stop the engine.

In a preferred embodiment of the present invention, it is preferred that the vehicle includes an indicator arranged to indicate, based on a detection result from the state detecting device, that the locked state has been set. Then, a notification of the locked state can be conveniently provided.

In a preferred embodiment of the present invention, it is preferred that the vehicle further includes a speed detecting device arranged to detect a vehicle speed, wherein the controller is arranged and programmed to control the switching mechanism to set the movable state when it is determined based on a detection result from the speed detecting device that the vehicle speed corresponds at least to a predetermined speed. When the vehicle speed corresponds to the predetermined speed or higher, the movable state is set, that is, the pair of wheels are permitted to move up and down. Consequently, when the vehicle speed corresponds to the predetermined speed or higher, the vehicle can make turns by leaning the vehicle body.

In a preferred embodiment of the present invention, it is preferred that the state detecting device is arranged to detect whether the coupling pin member is in a disengaged position disengaged from the support mechanism; and the controller is arranged and programmed, when it is determined based on the detection results from the speed detecting device and the state detecting device that the vehicle speed corresponds at least to a predetermined speed and the coupling pin member is away from the disengaged position, to return the coupling pin member to the disengaged position. This can conveniently prevent the coupling pin member from engaging with the support mechanism due to a malfunction to set the locked state when the vehicle speed corresponds at least to the predetermined speed.

In a preferred embodiment of the present invention, it is preferred that the controller is arranged and programmed, when it is determined based on the detection result from the speed detecting device that the vehicle speed corresponds at least to the predetermined speed, to withhold a control to cause the switching mechanism to switch to the locked state even if a command designating the locked state is inputted from the state control unit. When the vehicle speed corresponds at least to the predetermined speed, the controller will not carry out the control to switch to the locked state even if the state control unit accepts a command designating the locked state. This can conveniently prevent the locked state when the vehicle speed corresponds at least to the predetermined speed.

In a preferred embodiment of the present invention, it is preferred that the vehicle further includes a brake detecting device arranged to detect a braking operation, wherein the controller is arranged and programmed to control the switching mechanism in compliance with a command inputted from the state control unit when it is determined based on the detection results from the seating detecting device, the speed detecting device, and the brake detecting device that the rider is seated on the seat, the vehicle speed is less than the predetermined speed, and the braking operation is carried out. When the rider is seated, the rider can support the vehicle body with his or her feet resting on the traveling surface. When the vehicle speed is less than the predetermined speed and the brakes are operated, the saddle riding type vehicle is at a stop or nearly stopped. When all these conditions are met, with the rider seated on the saddle riding type vehicle at a stop or nearly stopped, operation of the state control unit becomes effective. That is, the controller controls the switching mechanism based on a command inputted from the state control unit. This allows the rider to make preparations conveniently before starting, stopping, or parking the vehicle.

In a preferred embodiment of the present invention, it is preferred that the vehicle further includes a speed detecting device arranged to detect a vehicle speed; and a brake detecting device arranged to detect a braking operation; wherein the controller is arranged and programmed to carry out the stop control on a condition that, based on detection results from the speed detecting device and the brake detecting device, the vehicle speed is less than a predetermined speed and the braking operation is carried out. The stop control is limited to the state of the saddle riding type vehicle being at a stop or nearly stopped. Therefore, the stop control can be carried out conveniently.

In a preferred embodiment of the present invention, it is preferred that the vehicle further includes a speed detecting device arranged to detect a vehicle speed, wherein the controller is arranged and programmed to carry out the stop control on a condition that, based on a detection result from the speed detecting device, the vehicle speed is substantially zero. The stop control is limited to the state of the saddle riding type vehicle being at a stop or nearly stopped. Therefore, the stop control can be carried out conveniently.

In a preferred embodiment of the present invention, it is preferred that the vehicle further includes a speed detecting device arranged to detect a vehicle speed, wherein the controller is arranged and programmed to control the switching mechanism to set the movable state when it is determined based on a detection result from the speed detecting device that the vehicle speed corresponds at least to a predetermined speed. Thus, the vehicle can make turns by leaning the vehicle body when the vehicle speed corresponds at least to the predetermined speed.

In a preferred embodiment of the present invention, it is preferred that the vehicle further includes a seating detecting device arranged to detect a rider seated on a seat; a speed detecting device arranged to detect a vehicle speed; a brake detecting device arranged to detect a braking operation; and a state control unit arranged to receive commands designating the locked state and the movable state from the rider; wherein the controller is arranged and programmed to control the switching mechanism in compliance with a command inputted from the state control unit when it is determined based on detection results from the seating detecting device, the speed detecting device, and the brake detecting device that the rider is seated on the seat, the vehicle speed is less than a predetermined speed, and the braking operation is carried out. When the rider is seated on the saddle riding type vehicle at a stop or nearly stopped, operation of the state control unit becomes effective. That is, the controller is programmed to control the switching mechanism based on a command inputted from the state control unit. This allows the rider to make preparations conveniently before starting, stopping, or parking the vehicle.

In a preferred embodiment of the present invention, it is preferred that the vehicle further includes a seating detecting device arranged to detect a rider seated on a seat; a speed detecting device arranged to detect a vehicle speed; and a state control unit arranged to receive commands designating the locked state and the movable state from the rider; wherein the controller is arranged and programmed to control the switching mechanism in compliance with a command inputted from the state control unit when it is determined based on detection results from the seating detecting device and the speed detecting device that the rider is seated on the seat and the vehicle speed is substantially zero. When the rider is seated on the saddle riding type vehicle at a stop or nearly stopped, operation of the state control unit becomes effective. That is, the controller controls the switching mechanism based on a command inputted from the state control unit. This allows the rider to make preparations conveniently before starting, stopping, or parking the vehicle.

According to another preferred embodiment of the present invention, the saddle riding type vehicle includes a vehicle body that stands unassisted in the locked state such that the saddle riding type vehicle can be parked or stored in the locked state.

The up-and-down direction of the vehicle body in the locked state is preferably substantially perpendicular to a traveling surface, wherein the saddle riding type vehicle can be stood unassisted conveniently.

The controller is preferably arranged and programmed to control a circuit operable by an engine stop switch to cut off the ignition electric system for the engine. Therefore, the construction can be simplified since the circuit operable by the engine stop switch acts also as the circuit arranged to cut off the ignition electric system for the engine.

The stop control preferably stops the fuel supply to the engine such that the controller can stop the engine conveniently.

The vehicle preferably includes a speed detecting device arranged to detect a vehicle speed, wherein the controller is arranged and programmed to control the switching mechanism to carry out a state change control to set the movable state before the stop control, when it is determined based on detection results from the state detecting device, the shift detecting device, and the speed detecting device that the vehicle speed corresponds at least to the predetermined speed, in the locked state and with the shift position being in the drive range.

Therefore, the state change control is carried out before the stop control when the vehicle speed corresponds at least to the predetermined speed even if the locked state has been set and the shift position is in the drive range. Consequently, switching is made to the movable state to allow the saddle riding type vehicle to continue running without stopping the engine.

The controller is preferably arranged and programmed to carry out the stop control when switching is not made to the movable state even if the state change control is carried out based on the detection result from the state detecting device. Therefore, running in the locked state can be avoided reliably.

The indicator is preferably arranged to give an indication to the rider such that the rider can be notified of the locked state conveniently.

The solenoid is preferably arranged to advance and retract the coupling pin member relative to the support mechanism. Therefore, the coupling pin member can be made to engage with and disengage from the support mechanism conveniently.

The state detecting device is preferably arranged to detect positions of a rear end of a movable core of the solenoid. Therefore, whether the coupling pin member is in a position disengaged from the support mechanism can be detected conveniently.

The state detecting device is preferably disposed adjacent a rear end of the solenoid. Therefore, whether the coupling pin member is in the position disengaged from the support mechanism can be detected conveniently.

The indicator is preferably arranged to indicate the movable state based on a detection result from the state detecting device such that a notification of the movable state can be provided conveniently.

The above and other elements, features, steps, characteristics and advantages of the present invention will become more apparent from the following detailed description of the preferred embodiments with reference to the attached drawings.

BRIEF DESCRIPTION OF THE DRAWINGS

For the purpose of illustrating preferred embodiments of the present invention, there are shown in the drawings several forms which are presently preferred, it being understood, however, that the present invention is not limited to the precise arrangement and instrumentalities shown.

DETAILED DESCRIPTION OF THE PREFERRED EMBODIMENTS

Figure 1:
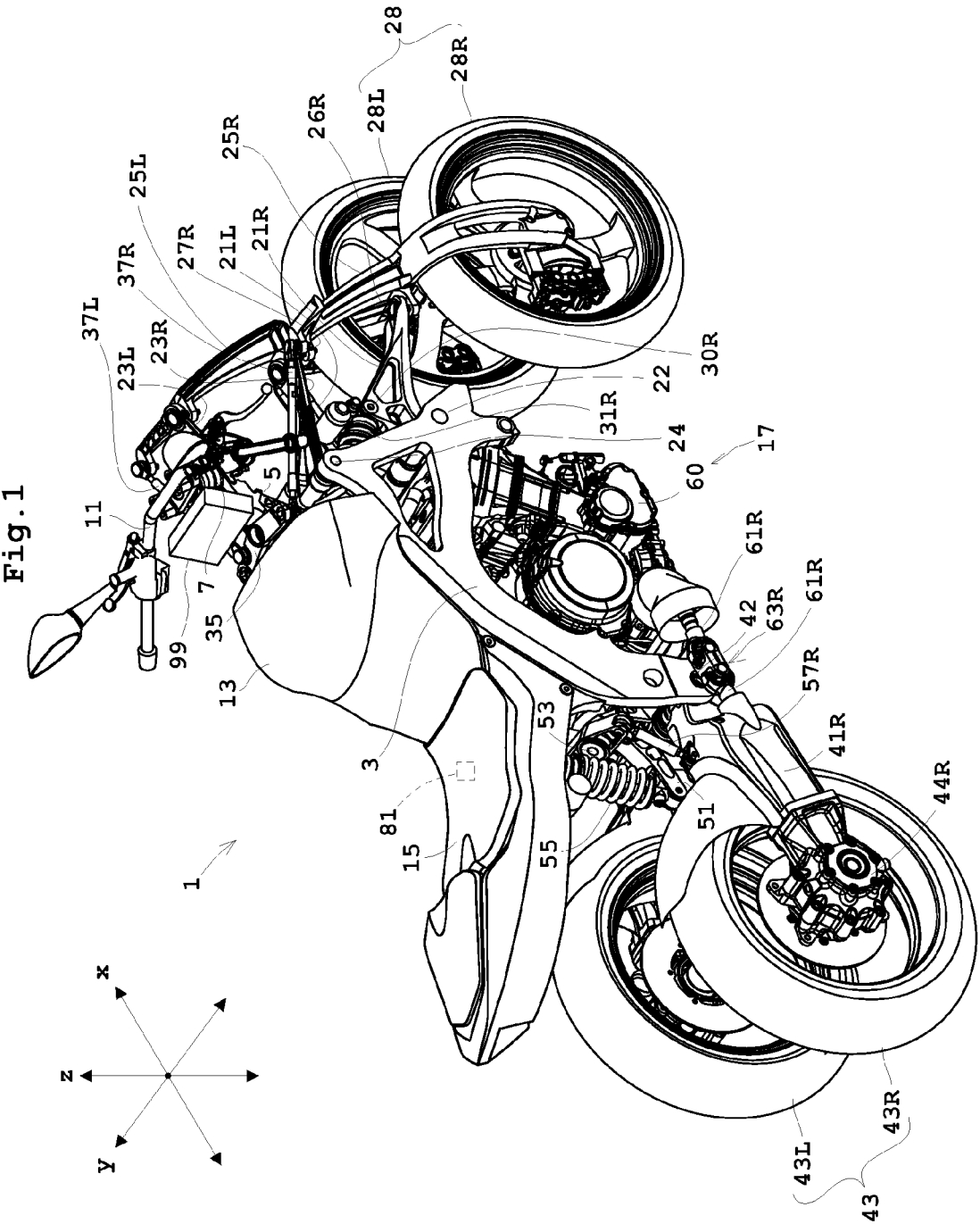
FIG. 1 is a perspective view showing an outline construction of a saddle riding type vehicle according to Preferred Embodiment 1 of the present invention.

Preferred embodiments of the present invention will be described in detail hereinafter with reference to the drawings.

Preferred Embodiment 1

A saddle riding type vehicle according to a preferred embodiment of the present invention will be described hereinafter referring to the drawings.

Figure 2:
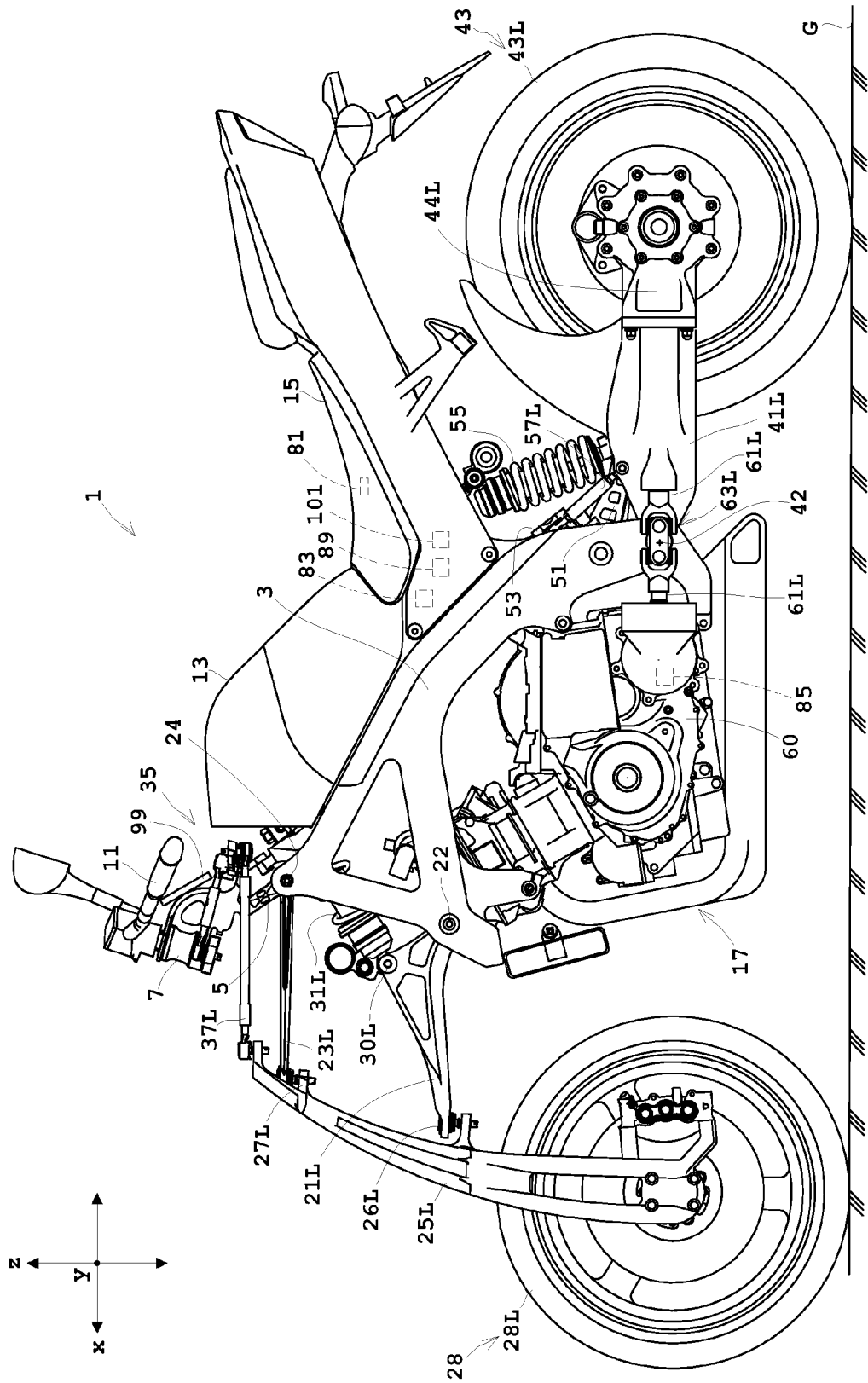
FIG. 2 is a side view showing an outward appearance of the saddle riding type vehicle.
Figure 3:
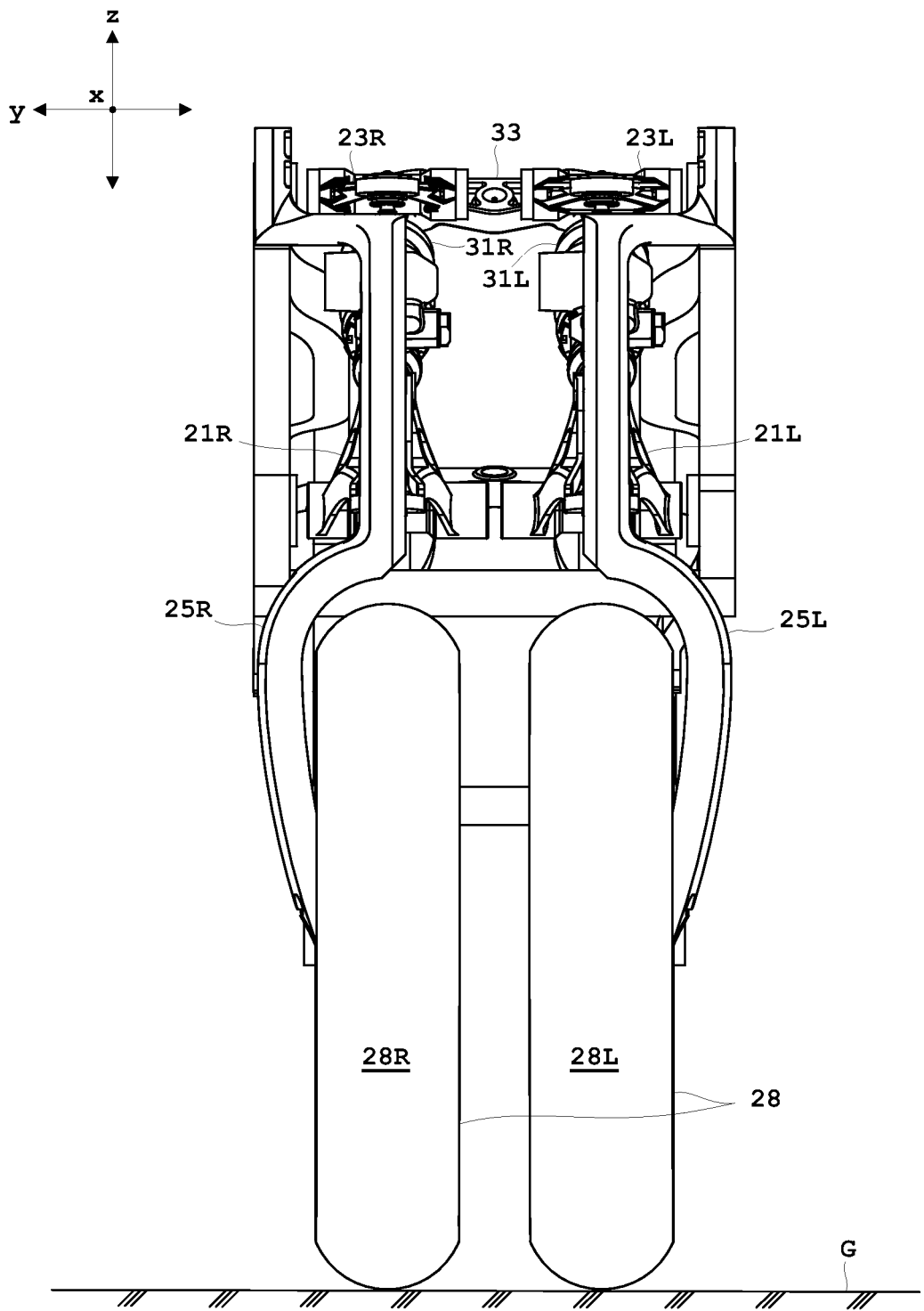
FIG. 3 is a front view of the saddle riding type vehicle.
Figure 4:
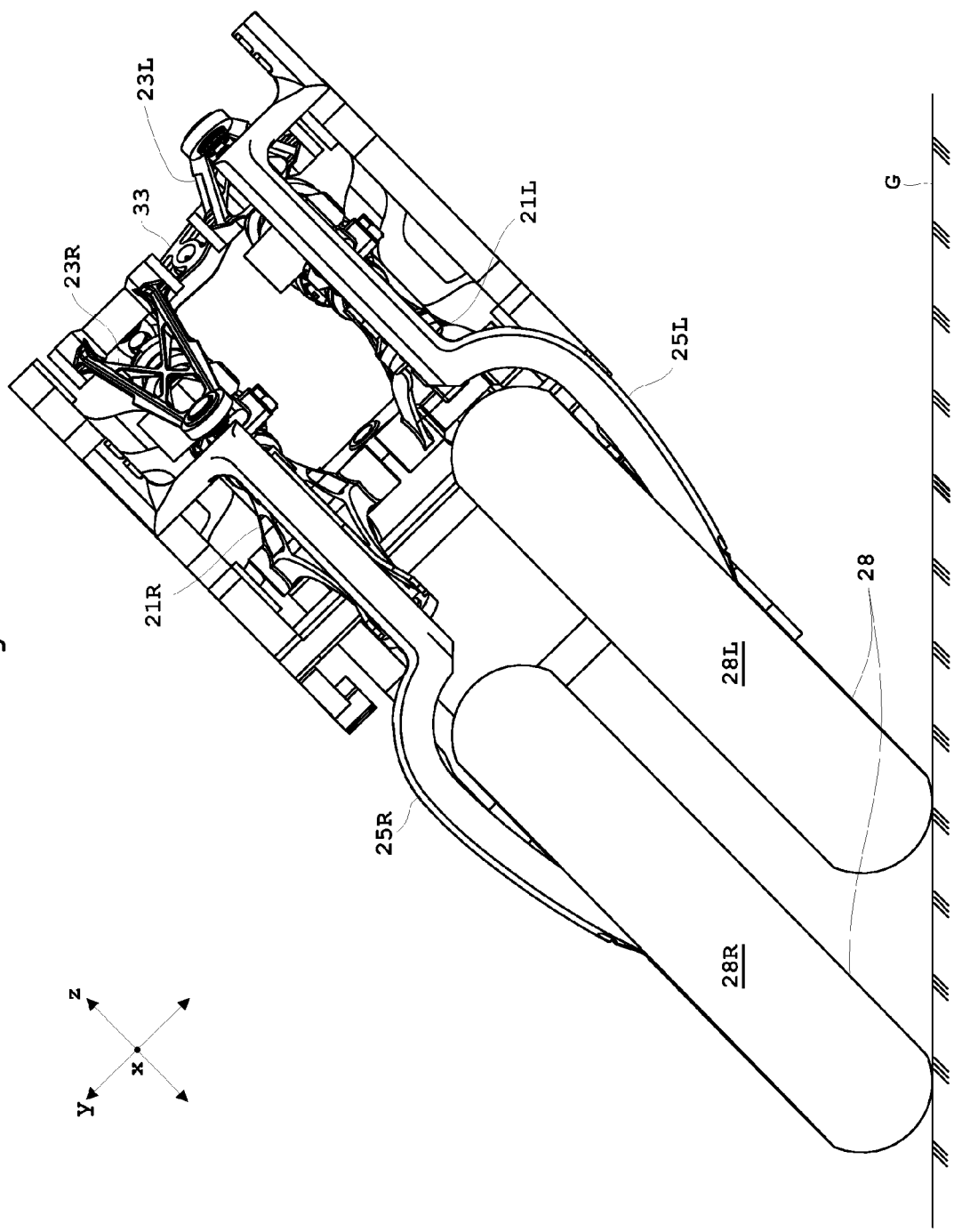
FIG. 4 is a front view of the saddle riding type vehicle in a leaning state.
Figure 5:
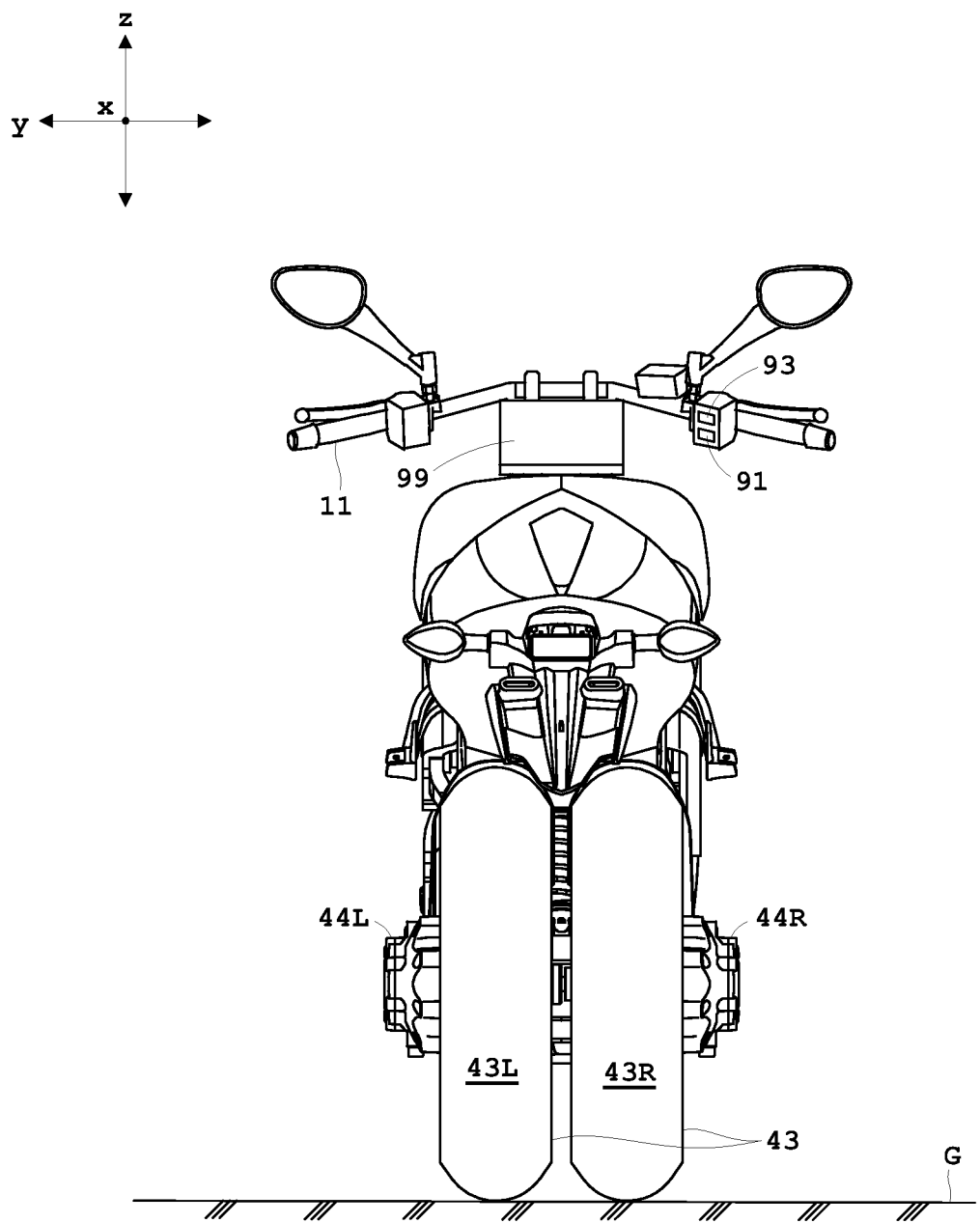
FIG. 5 is a rear view of the saddle riding type vehicle.
Figure 6:
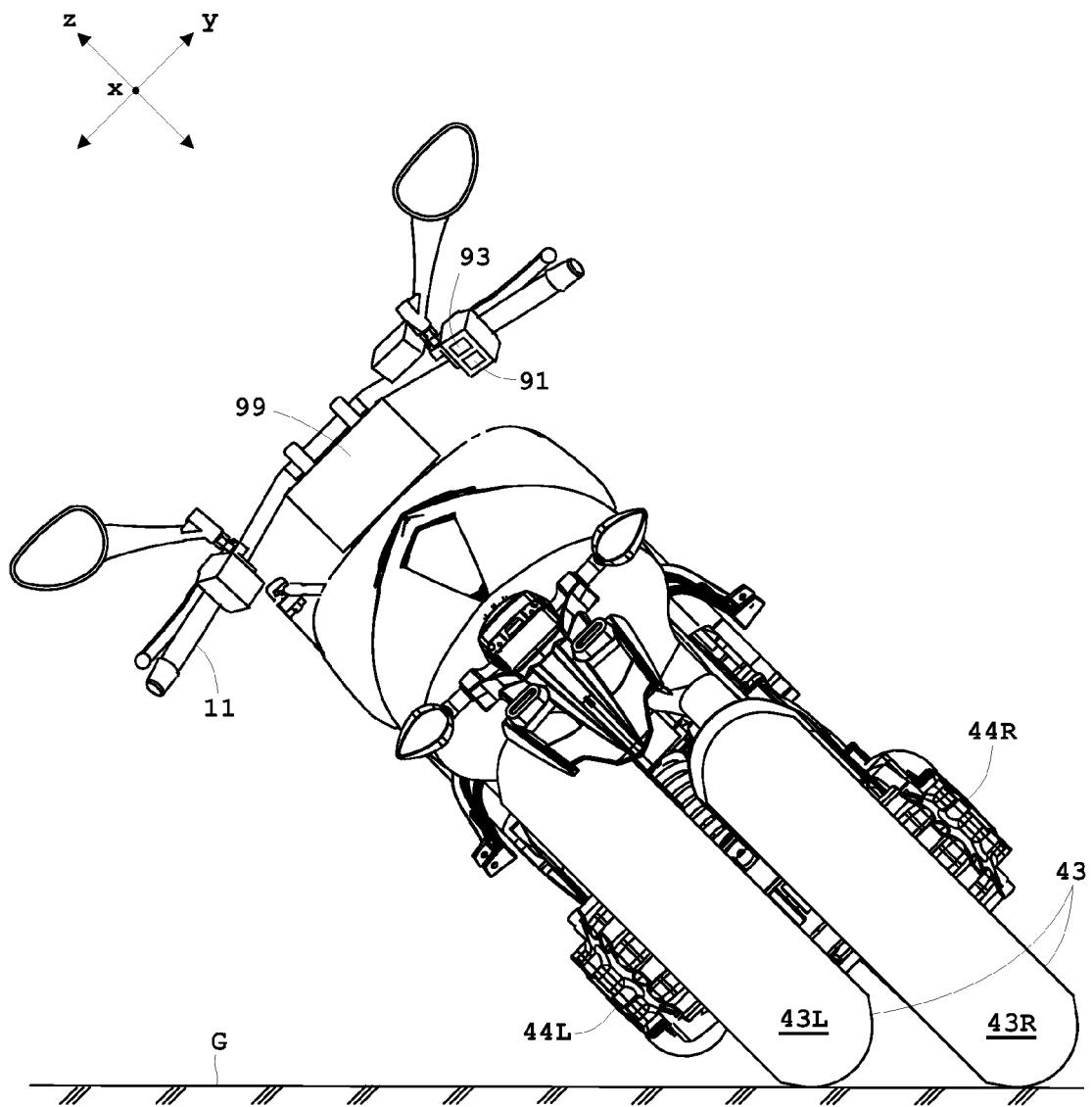
FIG. 6 is a rear view of the saddle riding type vehicle in a leaning state.

FIG. 1 is a perspective view showing an outline construction of a saddle riding type vehicle according to Preferred Embodiment 1. FIG. 2 is a side view showing an outward appearance of the saddle riding type vehicle. In FIG. 2, the left side of the drawing corresponds to the front of the saddle riding type vehicle, and the right side of the drawing corresponds to the rear of the saddle riding type vehicle. FIG. 3 is a front view of the saddle riding type vehicle. FIG. 4 is a front view of the saddle riding type vehicle in a leaning state. The handlebar, main frame and so on shown in FIGS. 1 and 2 are omitted from FIGS. 3 and 4. FIG. 5 is a rear view of the saddle riding type vehicle. FIG. 6 is a rear view of the saddle riding type vehicle in a leaning state.

In FIGS. 1 through 6, x-direction is the longitudinal direction of a vehicle body, y-direction is the transverse direction of the vehicle body, and z-direction is the up-and-down direction of the vehicle body. The longitudinal direction x, transverse direction y, and up-and-down direction z of the vehicle body extend perpendicular to one another. In a state of the vehicle body standing upright on a horizontal traveling surface G, the longitudinal direction x and transverse direction y of the vehicle body are horizontal, respectively, and the up-and-down direction z of the vehicle body is vertical. In the following description, the simple indications of "right" and "left" refer to the sides seen from the rider seated on the saddle riding type vehicle 1.

Reference is made to FIGS. 1 and 2. The saddle riding type vehicle 1 in this preferred embodiment is preferably a four-wheeled automotive vehicle including pairs of wheels at the front and rear of the vehicle body, respectively. The saddle riding type vehicle 1 has a main frame 3 located approximately centrally of the vehicle body. The main frame 3 has a head pipe 7 attached to a forward end thereof through a support frame 5. A handlebar 11 is attached to the head tube 7. A fuel tank 13 is mounted on an upper forward portion of the main frame 3. A seat 15 is mounted on an upper portion of the main frame 3 and rearward of the fuel tank 13. An engine 17 is mounted on a lower portion of the main frame 3 and below the fuel tank 13.

In the following description, the main frame 3 and components (e.g., the seat 15) rigidly secured to the main frame 3 will be referred to as a "vehicle body" where appropriate.

The main frame 3 includes, attached to lower front positions thereof, a lower right arm 21R and a lower left arm 21L arranged transversely of the vehicle body. One end of the lower right arm 21R is supported by the vehicle body to be rotatable about a pivot shaft 22 extending substantially parallel to the transverse direction y of the vehicle body. One end of the lower left arm 21L also is supported by the vehicle body to be rotatable about the pivot shaft 22. The other end of the lower right arm 21R and the other end of the lower left arm 21L extend forward of the vehicle body, respectively. The lower right arm 21R and lower left arm 21L are swingable independently of each other.

The main frame 3 has, attached to upper front positions thereof, an upper right arm 23R and an upper left arm 23L arranged transversely of the vehicle body. One end of the upper right arm 23R is supported by the vehicle body to be rotatable about a pivot shaft 24 extending substantially parallel to the transverse direction y of the vehicle body. One end of the upper left arm 23L also is supported by the vehicle body to be rotatable about the pivot shaft 24. The other end of the upper right arm 23R and the other end of the upper left arm 23L extend forward of the vehicle body, respectively. The upper right arm 23R and upper left arm 23L are swingable independently of each other.

A right knuckle arm 25R is connected to the other end of the lower right arm 21R. The right knuckle arm 25R extends obliquely upward. The lower right arm 21R is interlocked to a middle position of the right knuckle arm 25R through a ball joint. The other end of the upper right arm 23R is interlocked to an upper position of the right knuckle arm 25R through a ball joint.

As shown in FIG. 1, the positions where the lower right arm 21R and upper right arm 23R are connected to the right knuckle arm 25R, respectively, are called connecting points 26R and 27R. The right knuckle arm 25R is rotatable relative to the lower right arm 21R and upper right arm 23R about an axis extending between the connecting points 26R and 27R (hereinafter called simply "vertical axis"). As seen from a side, the pivot shafts 22 and 24 and connecting points 26R and 27R are arranged to correspond substantially to the vertices of a parallelogram. The right knuckle arm 25R supports a right wheel 28R in a lower position thereof to be rotatable about an axle.

When the lower right arm 21R and upper right arm 23R rotate upward about the pivot shaft 22 and pivot shaft 24, respectively, the right knuckle arm 25R will move upward. Conversely, when the lower right arm 21R and upper right arm 23R rotate downward, respectively, the right knuckle arm 25R will move downward. Consequently, the right wheel 28R moves up and down relative to the vehicle body.

Similarly, a left knuckle arm 25L is connected to the other end of the lower left arm 21L and the other end of the upper left arm 23L. The left knuckle arm 25L is interlocked to the lower left arm 21L at a connecting point 26L, and is interlocked to the upper left arm 23L at a connecting point 27L.

The left knuckle arm 25L supports a left wheel 28L. The left wheel 28L is opposed to the right wheel 28R across the vehicle body. The left wheel 28L moves up and down relative to the vehicle body with a swinging of the lower left arm 21L and upper left arm 23L.

In the following description, the right wheel 28R and left wheel 28L will be referred to as "right and left wheels 28" as appropriate. The right and left wheels 28 correspond to a pair of wheels in preferred embodiments of the present invention.

The lower right arm 21R is interlocked to a right shock absorber 31R at a connecting point 30R (see FIG. 1). The lower left arm 21L is interlocked to a left shock absorber 31L at a connecting point 30L (see FIG. 2). The other ends of the respective shock absorbers 31R and 31L are interlocked to opposite ends of a balance beam 33 (see FIGS. 3 and 4). The balance beam 33 is supported by the main frame 3 to be rotatable about a shaft at the middle thereof.

When, for example, the right wheel 28R moves down relative to the vehicle body, the lower right arm 21R will rotate downward about the pivot shaft 22. The lower right arm 21R pulls down one end of the balance beam 33 through the right shock absorber 31R. Consequently, the balance beam 33 rotates and pulls up the lower left arm 21L through the left shock absorber 31L connected to the other end of the balance beam 33. This raises the left wheel 28L by an amount corresponding to the descent of the right wheel 28R. Thus, the balance beam 33 interlocks rotation of the lower right arm 21R and rotation of the lower left arm 21L to move the right wheel 28R and left wheel 28L up and down in opposite directions. The amounts of up-and-down motion of the right wheel 28R and left wheel 28L are substantially equivalent amounts.

Here, the term "substantially equivalent amounts" not only refers to the case where the amounts of up-and-down motion of the right wheel 28R and left wheel 28L are strictly equal, but includes also the case of the amounts being substantially equal. The amounts being substantially equal may be cases where, for example, a difference occurs between the amounts of up-and-down motion of the right wheel 28R and left wheel 28L due to play in a connection between components such as the balance beam 33 and lower right arm 21R, deflection or deformation of each component itself, or surface shapes of the right and left wheels 28 which directly contact the traveling surface G.

The lower right arm 21R, lower left arm 21L, upper right arm 23R, upper left arm 23L, right knuckle arm 25R, left knuckle arm 25L, right shock absorber 31R, left shock absorber 31L and balance beam 33 correspond to the support mechanism (especially the support mechanism for the right and left wheels 28) in preferred embodiments of the present invention.

Reference is made to FIGS. 1 and 2. A steering link mechanism 35 is interlocked to a lower position of the handlebar 11 noted hereinbefore. The steering link mechanism 35 includes a right steering rod 37R and a left steering rod 37L connected thereto. The other end of the right steering rod 37R is interlocked to a position at the upper end of the right knuckle arm 25R and offset from the vertical axis thereof. The other end of the left steering rod 37L is interlocked to a position at the upper end of the left knuckle arm 25L and offset from the vertical axis thereof. The handlebar 11 is operable to rotate the right knuckle arm 25R and left knuckle arm 25L about the vertical axes, respectively, and give a steering angle to the right and left wheels 28.

Reference is made to FIGS. 1 and 2. The main frame 3 has, attached to lower rear positions thereof, a right rear arm 41R and a left rear arm 41L arranged transversely of the vehicle body. One end of the right rear arm 41R is supported by the main frame 3 to be rotatable about a pivot shaft 42 extending substantially parallel to the transverse direction y of the vehicle body. One end of the left rear arm 41L is supported by the main frame 3 to be rotatable about the pivot shaft 42. The other end of the right rear arm 41R and the other end of the left rear arm 41L extend rearward of the vehicle body, respectively. The right rear arm 41R and left rear arm 41L are swingable independently of each other.

A right wheel 43R is rotatably supported by the rear end of the right rear arm 41R through a right rear gear case 44R. A left wheel 43L is rotatably supported by the rear end of the left rear arm 41L through a left rear gear case 44L. The right wheel 43R and left wheel 43L are arranged at opposite sides of the vehicle body to be opposed to each other across the vehicle body.

When the right rear arm 41R rotates up and down about the pivot shaft 42, the right wheel 43R moves up and down relative to the vehicle body. Similarly, when the left rear arm 41L rotates up and down about the pivot shaft 42, the left wheel 43L moves up and down relative to the vehicle body.

In the following description, the right wheel 43R and left wheel 43L will be referred to as "right and left wheels 43" as appropriate. The right and left wheels 43 correspond to a pair of wheels in the present preferred embodiment of the present invention.

Reference is made to FIG. 1. A carrier beam 51 is disposed in a lower position at the rear end of the main frame 3 and between the right rear arm 41R and left rear arm 41L. The front end of the carrier beam 51 is supported by the main frame 3. The rear end of the carrier beam 51 extends rearward of the vehicle body. The rear end of the carrier beam 51 is connected to the main frame 3 through a shock absorber 55. The shock absorber 55 absorbs impacts from the traveling surface. The carrier beam 51 rotatably holds a stabilizer 53.

Figure 7:
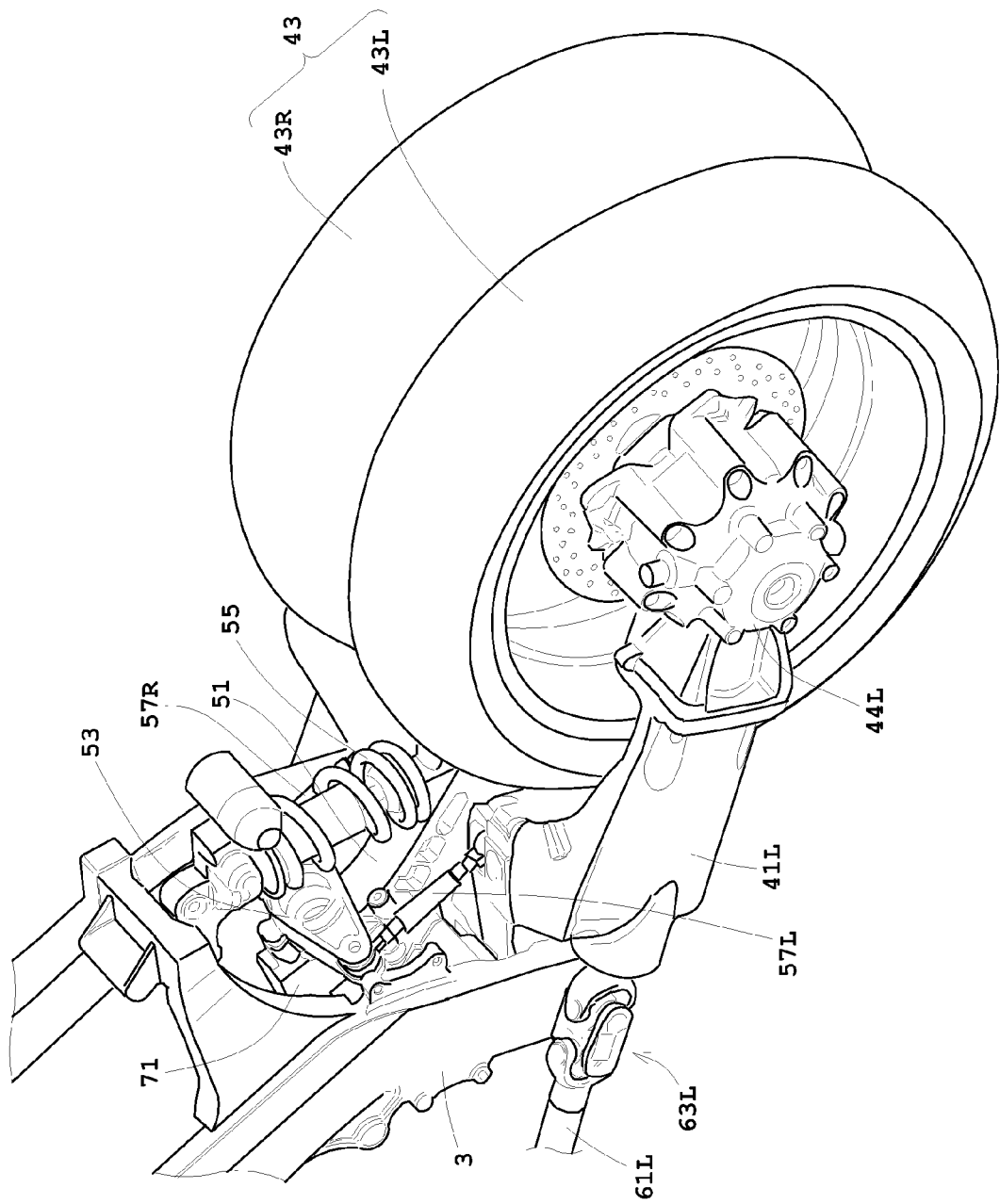
FIG. 7 is a perspective view of principal portions of a support mechanism and a switching mechanism seen from an obliquely rearward position.
Figure 8:
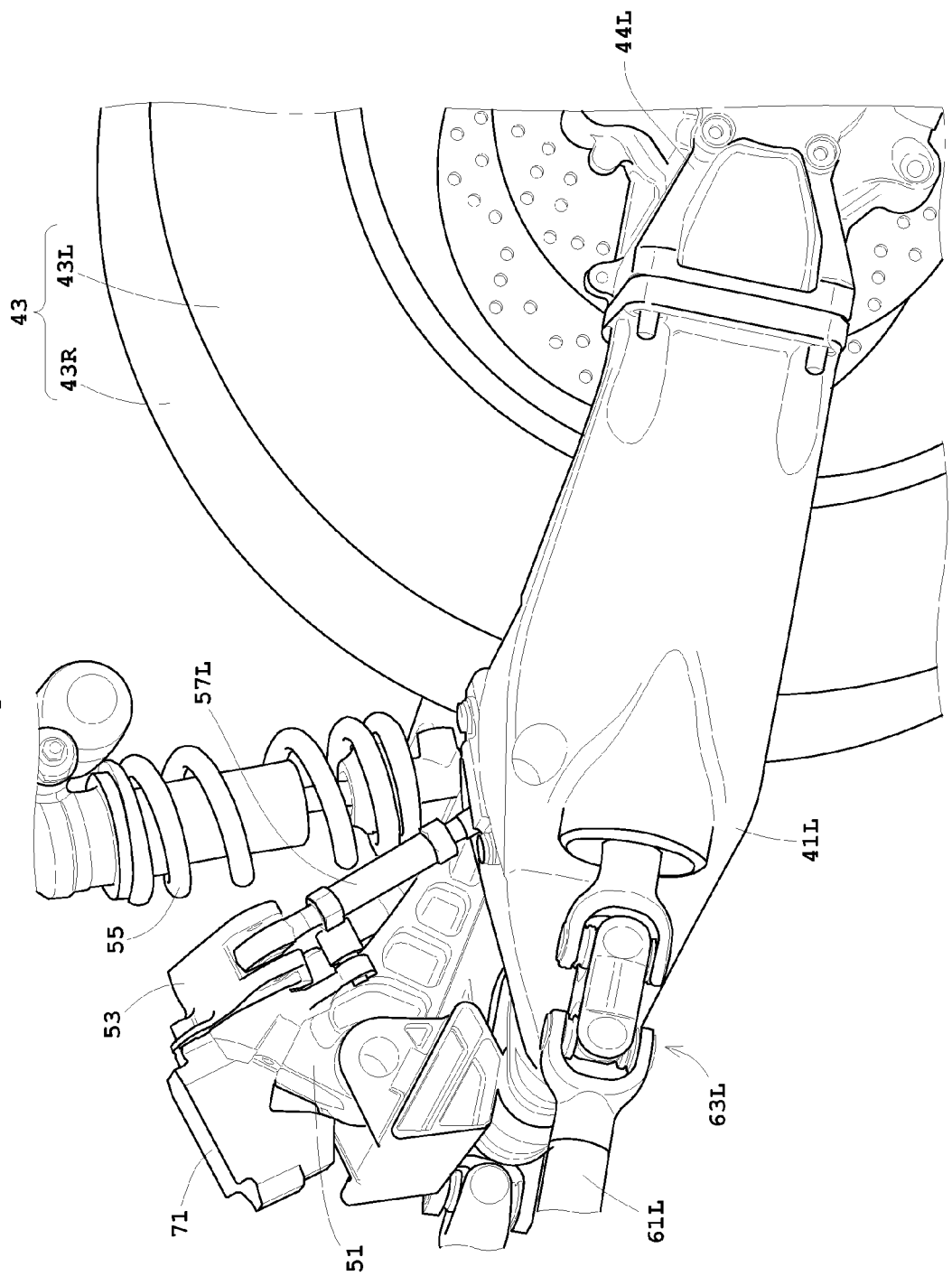
FIG. 8 is a perspective view of the principal portions of the support mechanism and switching mechanism seen from a side.

Reference is made to FIGS. 7 and 8. FIG. 7 is a perspective view, seen from an obliquely rearward position, of principal portions of a support mechanism and a switching mechanism of the saddle riding type vehicle according to Preferred Embodiment 1. FIG. 8 is a perspective view of the principal portions seen from a side. The carrier beam 51 rotatably holds the stabilizer 53. A right rod 57R and a left rod 57L are interlocked to opposite ends of the stabilizer 53, respectively. The other end of the right rod 57R is interlocked to the right rear arm 41R. The other end of the left rod 57L is interlocked to the left rear arm 41L.

When, for example, the right wheel 43R moves down relative to the vehicle body, the right rear arm 41R will rotate downward about the pivot shaft 42. The right rear arm 41R pulls down one end of the stabilizer 53 through the right rod 57R. Consequently, the stabilizer 53 rotates and pulls up the left rear arm 41L through the left rod 57L connected to the other end of the stabilizer 53. This raises the left wheel 43L by an amount corresponding to the descent of the right wheel 43R. Thus, the stabilizer 53 interlocks swinging of the right rear arm 41R and swinging of the left rear arm 41L to move the right wheel 43R and left wheel 43L up and down in opposite directions. The amounts of up-and-down motion of the right wheel 43R and left wheel 43L are substantially equivalent amounts. Here, the term "substantially equivalent amounts" not only refers to the case where the amounts of up-and-down motion of the right wheel 43R and left wheel 43L are strictly equal, but includes also the case of the amounts being substantially equal.

The right rear arm 41R, left rear arm. 41L, carrier beam. 51, stabilizer 53, shock absorber 55, right rod 57R, and left rod 57L correspond to the support mechanism (especially the support mechanism for the right and left wheels 43) in the present preferred embodiment of the present invention.

Reference is made to FIGS. 1 and 2. The engine 17 has a crankcase 60. The crankcase 60 houses a speed changer as well as a crankshaft (neither being shown). Power generated by the engine 17 is outputted from an output shaft (not shown) of the speed changer extending substantially parallel to the transverse direction y of the vehicle body.

This output shaft is connected to a pair of right and left drive shafts 61R and 61L through bevel gears (not shown). The drive shaft 61R includes a double cardan joint 63R mounted in an intermediate position thereof. The double cardan joint 63R has the center thereof located on an extension of the pivot shaft 42 noted hereinbefore. Consequently, the drive shaft 61R has a flexible axis of rotation.

The drive shaft 61R is held, in a position rearward of the double cardan joint 63R, by the right rear arm 41R through a bearing (not shown) to be rotatable about its axis. Consequently, the drive shaft 61R is rotatable with the right rear arm 41R about the pivot shaft 42. The rear end of the drive shaft 61R is interlocked to the right wheel 43R through bevel gears (not shown) mounted in the right rear gear case 44R.

The drive shaft 61L is similar in construction to the drive shaft 61R. A double cardan joint 63L also is similar in construction to the double cardan joint 63R.

When the engine 17 generates power, the output shaft transmits the power to the drive shafts 61R and 61L. The drive shaft 61R rotates about its axis and transmits the power to the right wheel 43R. Consequently, the right wheel 43R rotates about its axle. Similarly, the drive shaft 61L transmits the power to the left wheel 43L. Consequently, the left wheel 43L rotates about its axle.

Figure 9:
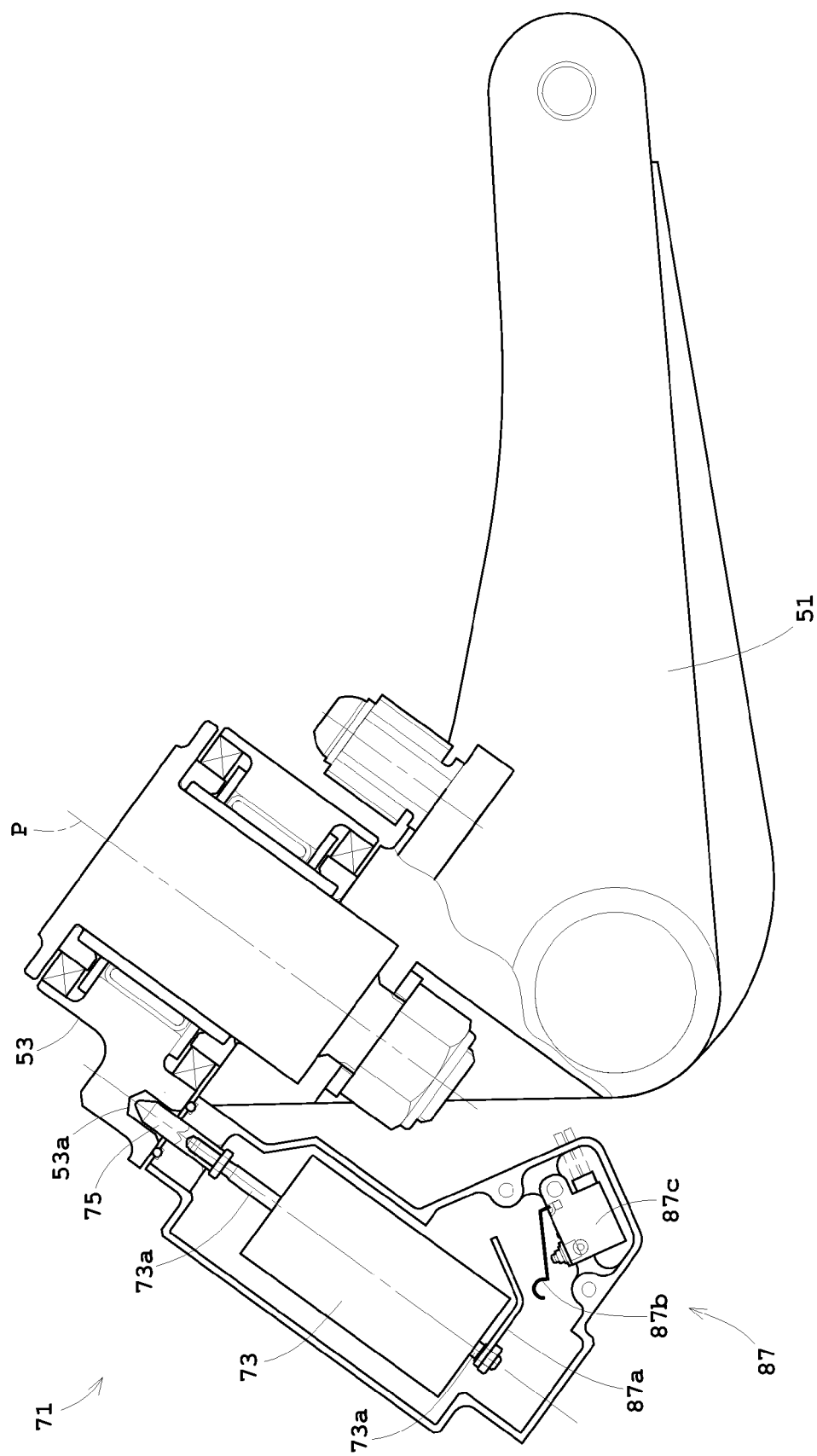
FIG. 9 is a sectional view of the principal portions of the support mechanism and switching mechanism in a locked state.
Figure 10:
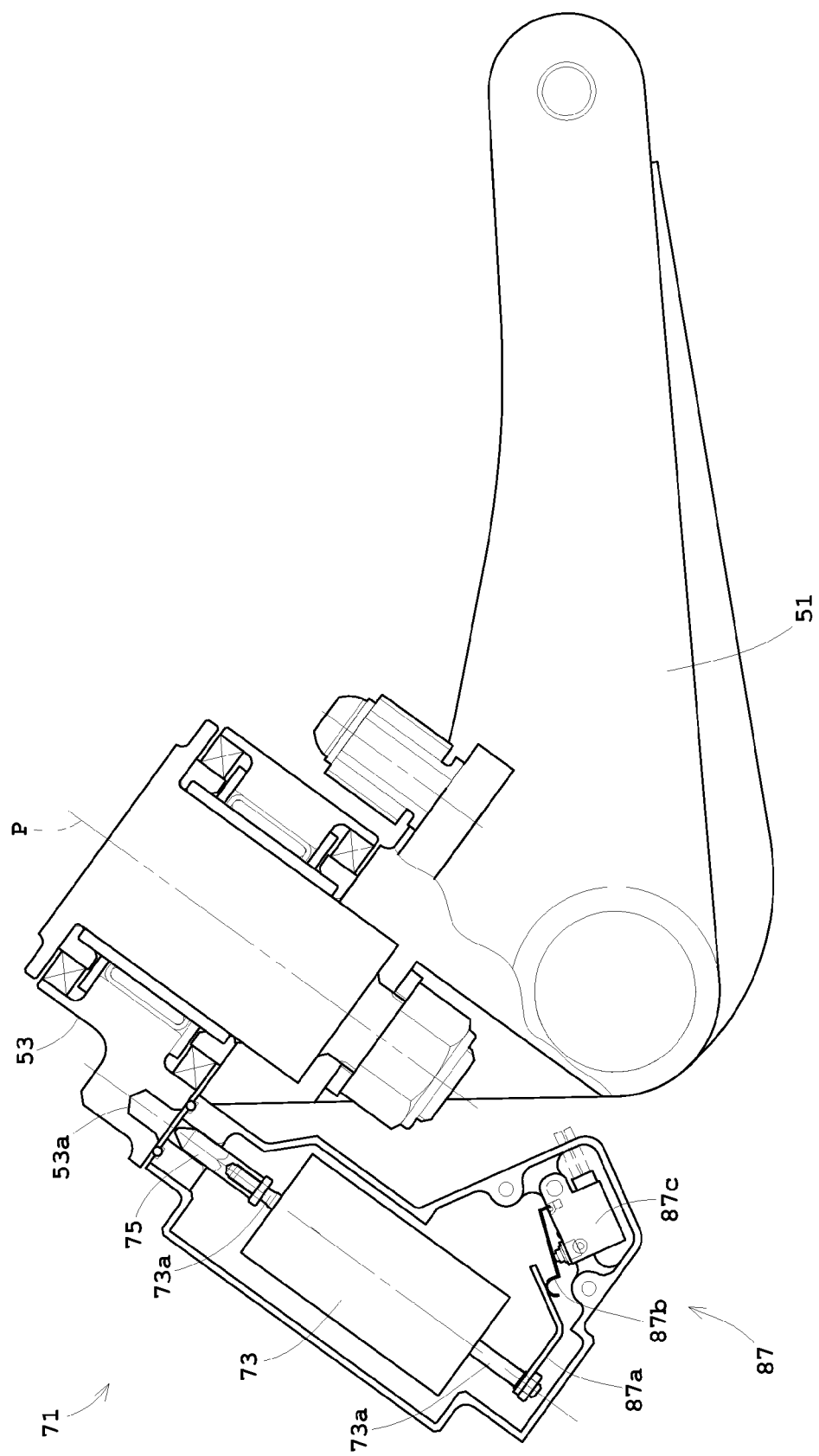
FIG. 10 is a sectional view of the principal portions of the support mechanism and switching mechanism in a movable state.

Reference is made to FIGS. 9 and 10. FIGS. 9 and 10 are sectional views of the principal portions of the support mechanism and switching mechanism. FIG. 9 shows a locked state, while FIG. 10 shows a movable state. The switching mechanism 71 includes a solenoid 73 and a coupling pin member 75.

The solenoid 73 is preferably integral with the carrier beam 51. The solenoid 73 has a movable core 73a which is moved by excitation of a coil. The movable core 73a is moved bi-directionally along one axis by changing the direction of a current applied to the coil. In Preferred Embodiment 1, the solenoid 73 is preferably a self-holding type. That is, after moving the movable core 73a, the position of the movable core 73a is maintained even if the current application to the coil is stopped. The coupling pin member 75 is attached to one end of the movable core 73a.

The stabilizer 53 has a recess 53a therein for mating with the coupling pin member 75. The recess 53a is located in a position closely opposed to the switching mechanism 71. The position of the recess 53a is deviated from a rotational axis P of the stabilizer 53. The recess 53a has an opening slightly larger than the coupling pin member 75.

When the solenoid 73 advances the coupling pin member 75 toward the stabilizer 53, the forward end of the coupling pin member 75 is inserted into the recess 53a, whereby the coupling pin member 75 is coupled to the stabilizer 53. Consequently, the stabilizer 53 is restricted in rotating about the rotational axis P relative to the carrier beam 51 (vehicle body). This results in a limitation of the rotation about the pivot shaft 42 of the right rear arm 41R and left rear arm 41L, and a limitation of the up-and-down motion relative to the vehicle body of the right wheel 43R and left wheel 43L.

In this specification, the state in which the up-and-down motion relative to the vehicle body of the right wheel 43R and left wheel 43L is limited as noted above is called the locked state. With the construction in this preferred embodiment, in the locked state, the rotation about the pivot shaft 42 of the right rear arm 41R and left rear arm 41L is limited, the stabilizer 53 is restricted in rotating about the rotational axis P relative to the vehicle body (carrier beam 51), and the coupling pin member 75 is coupled to the stabilizer 53. Therefore, these states can be called the locked state. Or the state of the saddle riding type vehicle 1 combining the above states can be called the locked state. In the locked state, the vehicle body cannot lean with the right wheel 43R and left wheel 43L contacting the traveling surface, but stands unassisted.

It is preferable that, in this locked state, the up-and-down direction z of the vehicle body is substantially vertical. In other words, it is preferable to select and design the positions of the coupling pin member 75 and recess 53a so that the coupling pin member 75 and recess 53a may mate with each other when the right wheel 43R and left wheel 43L are at substantially the same height relative to the vehicle body.

When the solenoid 73 retracts the coupling pin member 75, the coupling pin member 75 is drawn out of the recess 53a, and disengages from the stabilizer 53. Consequently, the stabilizer 53 is permitted to rotate about the rotational axis P relative to the vehicle body (carrier beam 51). As a result, the right wheel 43R and left wheel 43L are permitted to move up and down relative to the vehicle body.

In this specification, the state in which the right wheel 43R and left wheel 43L are permitted to move up and down relative to the vehicle body as noted above is called the movable state. With the construction in this preferred embodiment, the state of the right rear arm 41R and left rear arm 41L, the state of the stabilizer 53 or the state of the coupling pin member 75, or the state of the saddle riding type vehicle 1 combining these states, can be called the movable state. In the movable state, the vehicle body can be leaned with the right wheel 43R and left wheel 43L contacting the traveling surface.

In the following description, the position of the coupling pin member 75 coupled to the stabilizer 53 as shown in FIG. 9 will be called the engaged position. The position of the coupling pin member 75 separated from the stabilizer 53 as shown in FIG. 10 will be called the disengaged position.

The saddle riding type vehicle 1 includes a seating sensor 81, a speed sensor 83, a neutral switch 85, a state sensor 87, and a brake sensor 89.

As shown in FIGS. 1 and 2, the seating sensor 81 is disposed in the seat 15 to detect whether the rider is seated on the seat 15. The seating sensor 81 is preferably a pressure sensor such as a piezoelectric element, for example. The seating sensor 81 corresponds to the seating detecting device in the present preferred embodiment of the present invention.

As shown in FIG. 2, the speed sensor 83 detects vehicle speeds. The speed sensor 83 corresponds to the speed detecting device in the present preferred embodiment of the present invention.

As shown in FIG. 2, the neutral switch 85 is disposed in the crankcase 60. The neutral switch 85 detects whether a shift position of the speed changer is in a neutral range. In this specification, the neutral range includes neutral and also a shift position for rendering the saddle riding type vehicle 1 immovable, such as for parking (power cannot be transmitted to the right and left wheels 43). In addition to the neutral range, a drive range includes shift positions for moving the saddle riding type vehicle 1, such as for a first speed, a second speed and so on (power can be transmitted to the right and left wheels 43). It can also be said, therefore, that the neutral switch 85 detects whether a shift position of the speed changer is in the drive range. The neutral switch 85 is preferably a microswitch, for example. The neutral switch 85 corresponds to the shift detecting device in the present preferred embodiment of the present invention.

As shown in FIGS. 9 and 10, the state sensor 87 is disposed at the rear end of the solenoid 73, i.e., at the end remote from the coupling pin member 75. The state sensor 87 preferably includes a plate member 87a, a lever 87b, and a microswitch 87c. The plate member 87a is fixed to the rear end of the movable core 73a, and is shaped to be able to depress the lever 87b. When the coupling pin member 75 is in the disengaged position as shown in FIG. 10, the plate member 87a depresses the lever 87b. When the coupling pin member 75 moves away from the disengaged position as shown in FIG. 9, the plate member 87a separates from the lever 87b whereby the lever 87b moves up. The microswitch 87c detects presence or absence of input from the lever 87b. The state sensor 87 is constructed to, when the coupling pin member 75 moves away from the disengaged position and even before the coupling pin member 75 reaches the engaged position, detect that the coupling pin member 75 is absent from the disengaged position.

As shown in FIG. 2, the brake sensor 89 detects whether a braking operation is carried out by the rider. The brake sensor 89 corresponds to the brake detecting device in the present preferred embodiment of the present invention.

As shown in FIGS. 5 and 6, the handlebar 11 of the saddle riding type vehicle 1 includes a state control unit 91 and an engine stop switch 93.

The state control unit 91 is operable by the rider. The state control unit 91 receives from the rider commands designating the locked state and the movable state, and gives the received commands to a controller 101 described hereinafter.

Figure 11:
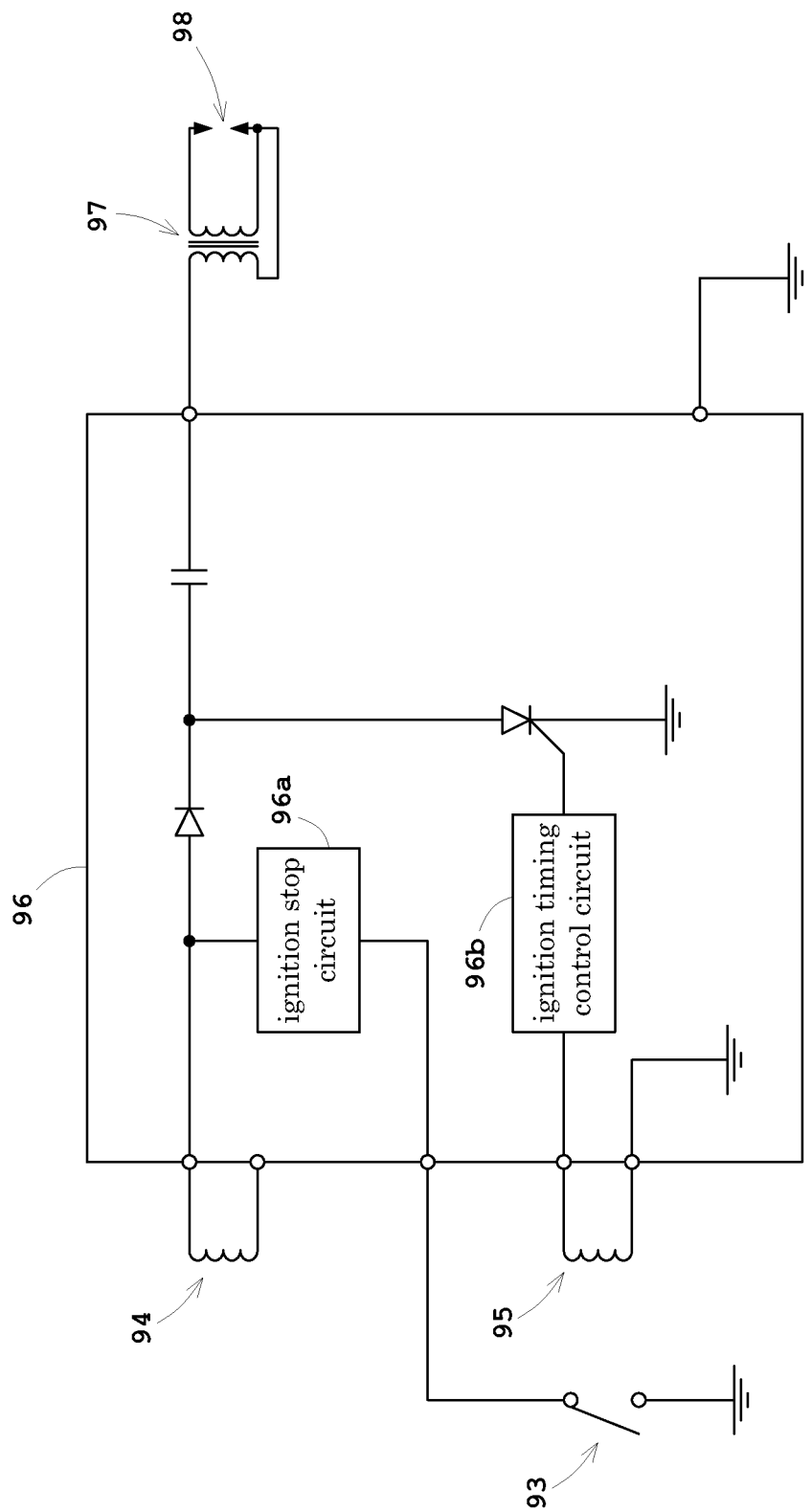
FIG. 11 is a circuit diagram of an engine stop switch and an ignition electric system for an engine.

The engine stop switch 93 receives an operation by the rider, and stops the engine 17. FIG. 11 is a circuit diagram of the engine stop switch 93 and an ignition electric system for the engine 17. As shown, the ignition electric system for the engine 17 includes a magneto coil 94 for ignition, a magneto coil 95 for ignition timing control, a CDI (Capacitor Discharge Ignition) unit 96, an ignition coil 97 and a spark plug 98. The CDI unit 96 includes an ignition stop circuit 96a and an ignition timing control circuit 96b. The ignition stop circuit 96a is connected to the engine stop switch 93, and is constructed to stop power supply to the spark plug 98 in response to an operation of the engine stop switch 93. This operation stops the engine 17.

An indicator 99 is disposed immediately rearward of the handlebar 11. The indicator 99 displays various information.

Figure 12:
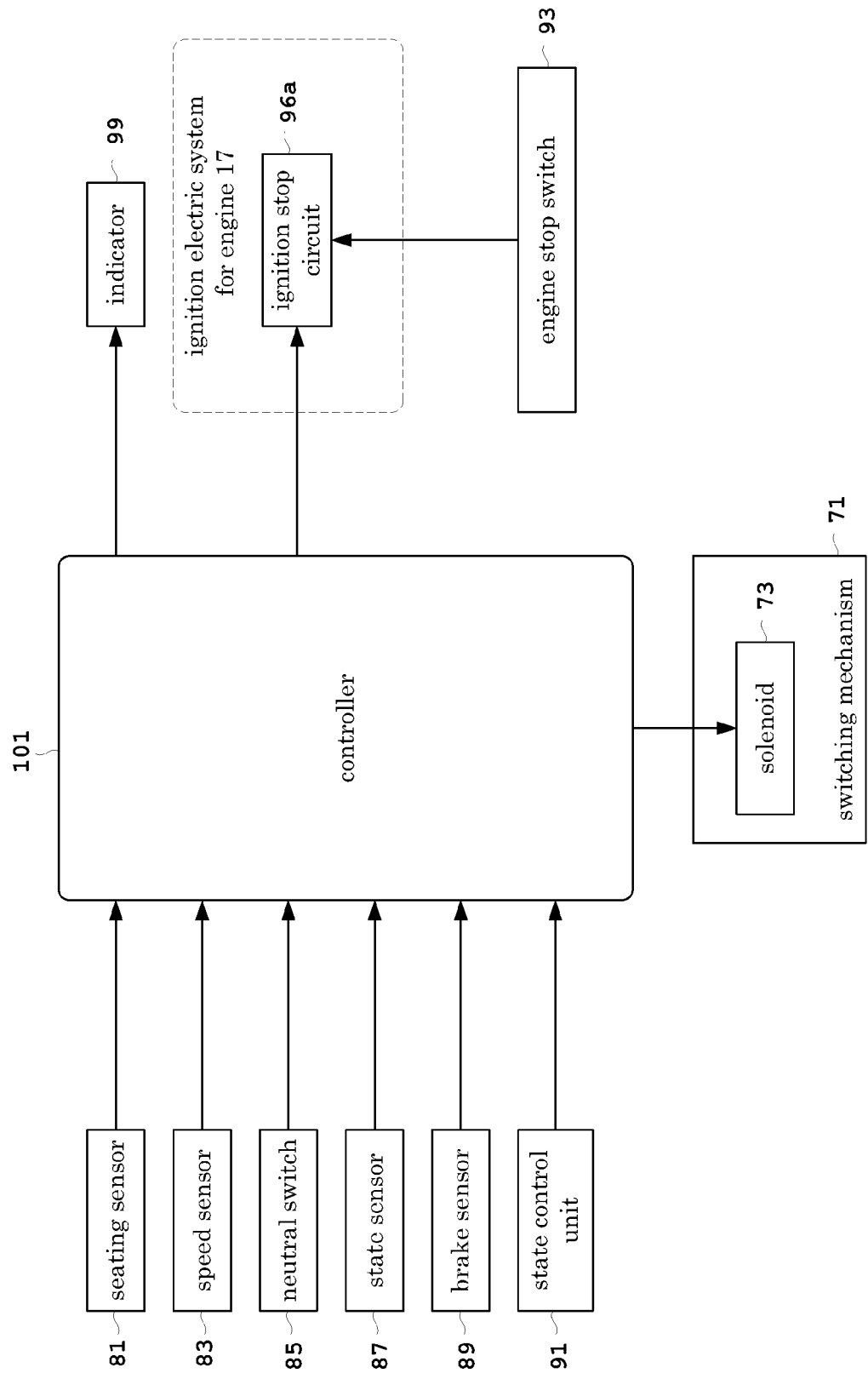
FIG. 12 is a block diagram showing an outline construction of a control system.

FIG. 12 is a block diagram showing an outline construction of a control system provided for the saddle riding type vehicle 1. The controller 101 receives detection results from the seating sensor 81, speed sensor 83, neutral switch 85, state sensor 87 and brake sensor 89. The commands received by the state control unit 91 and engine stop switch 93 also are inputted to the controller 101.

The controller 101 controls the solenoid 73 to advance and retract the coupling pin member 75. The controller 101 controls also the ignition stop circuit 96a of the ignition electric system for the engine 17 to stop the engine 17. Further, the controller 101 causes the indicator 99 to display various information.

The controller 101 is preferably a central processing unit (CPU) programmed to perform various processes and a storage medium, or a microcomputer. The storage medium stores in advance threshold values for making various determinations based on detection results from the detecting devices, and a value of a predetermined speed v for comparison with detection results from the speed sensor 83. The predetermined speed v is 10 km/h, for example. However, the predetermined speedy is not limited to the above example, but a different, appropriate value may be selected and set, such as 3 km/h, 5 km/h, or 15 km/h.

Next, examples of operation of the saddle riding type vehicle 1 according to the present preferred embodiment will be described, as divided into a time of parking/storage and a time of riding.

The rider turns a main key OFF, and then operates the state control unit 91 to designate the locked state. Consequently, the state control unit 91 gives the received command to the controller 101. The controller 101 controls the switching mechanism 71 to set the right and left wheels 43 to the locked state. Specifically, current is fed to the solenoid 73 whereby the movable core 73a places the coupling pin member 75 in the engaged position. After the coupling pin member 75 is placed in the engaged position, the current feed to the solenoid 73 is stopped. The above restricts the rotation of the stabilizer 53 relative to the vehicle body (carrier beam 51), and restricts the up-and-down movement of the right and left wheels 43 relative to the vehicle body. That is, the vehicle is in the locked state. The vehicle body is supported by the right and left wheels 28 and right and left wheels 43, and stands unassisted on the traveling surface.

Figure 13:
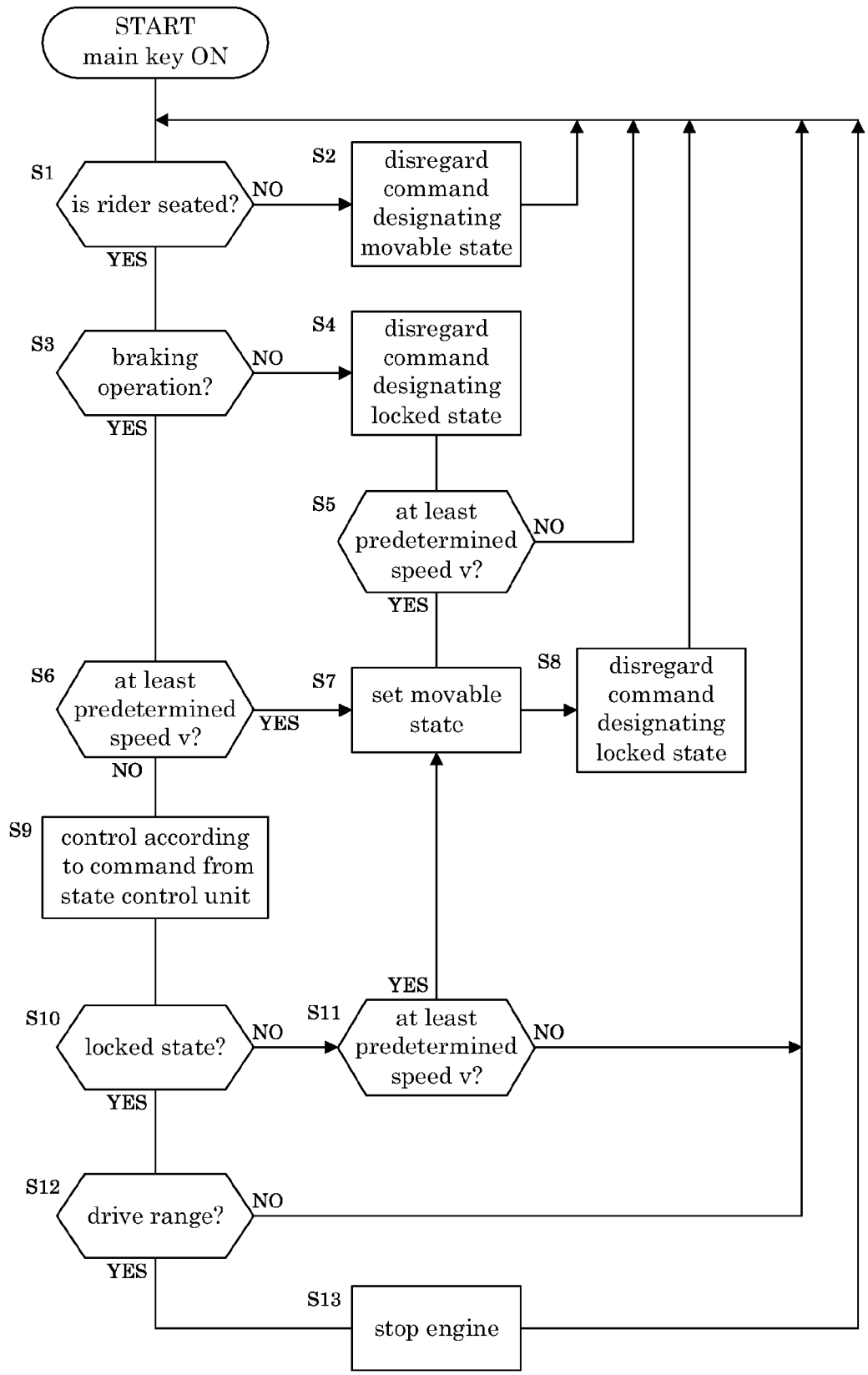
FIG. 13 is a flow chart showing an operating sequence of the saddle riding type vehicle according to Preferred Embodiment 1 of the present invention.

An example of operation at a time of riding will be described, centering on controls by the controller 101, with reference to FIG. 13. FIG. 13 is a flow chart showing an operating sequence of the saddle riding type vehicle 1. The following description assumes that the rider has already turned the main key ON. When the main key is turned ON, the vehicle may be in whichever of the locked state and movable state.

<Step S1> is Rider Seated?

The controller 101 reads a detection result from the seating sensor 81, and determines whether the rider is seated on the seat 15. When it is determined that the rider is seated, the operation proceeds to step S3. Otherwise, it is determined as a result that the rider is not seated, the operation proceeds to step S2.

Any arbitrary time is selected for a cycle of performing a series of processes in step S1 and succeeding steps S2 through S13. The series of processes may be carried out at intervals of 100 msec, for example.

<Step S2> Disregard Command Designating Movable State

Even if a command designating the movable state is inputted to the controller 101 from the state control unit 91, the controller 101 will not carry out the control for a change to the movable state, i.e., will not move the coupling pin member 75 to the engaged position. In other words, the controller 101 will disregard (will not accept) the command inputted from the state control unit 91 designating the movable state. Then, the operation returns to step S1.

<Step S3> Braking Operation?

The controller 101 reads a detection result from the brake sensor 89, and determines whether a braking operation is carried out. When it is determined as a result that a braking operation is carried out, the operation proceeds to step S6. Otherwise, the operation proceeds to step S4.

<Step S4> Disregard Command Designating Locked State

Even if a command designating the locked state is inputted to the controller 101 from the state control unit 91, the controller 101 will not carry out the control for a change to the locked state, i.e., will not advance the coupling pin member 75 to the engaged position. In other words, the controller 101 will disregard (will not accept) the command inputted from the state control unit 91 designating the locked state. Then, the operation proceeds to step S5.

\<Step S5\> At Least Predetermined Speed v?

The controller 101 reads a detection result from the speed sensor 83, and determines whether the vehicle speed corresponds at least to the predetermined speed v. When it is determined as a result that the vehicle speed corresponds at least to the predetermined speed v, the operation proceeds to step S7. Otherwise, the operation returns to step S1.

\<Step S6\> At Least Predetermined Speed v?

As in step S5, the controller 101 reads a detection result from the speed sensor 83, and compares the vehicle speed and predetermined speed v. When it is determined as a result that the vehicle speed corresponds at least to the predetermined speed v, the operation proceeds to step S7. Otherwise, the operation proceeds to step S9.

\<Step S7\> Set Movable State

The controller 101 controls the switching mechanism 71 to set the right and left wheels 43 to the movable state. Specifically, current is supplied to the solenoid 73 whereby the movable core 73a places the coupling pin member 75 in the disengaged position. After the coupling pin member 75 is placed in the disengaged position, the current supply to the solenoid 73 is stopped. Since the solenoid 73 is the self-holding type, the coupling pin member 75 is maintained in the disengaged position after the current supply is stopped.

The above permits the stabilizer 53 to rotate about the rotational axis P relative to the vehicle body (carrier beam 51), permits the right rear arm 41R and left rear arm 41L to rotate about the pivot shaft 42, and permits the right wheel 43R and left wheel 43L to move up and down relative to the vehicle body. That is, the right wheel 43R and left wheel 43L are in the movable state. The vehicle body is now capable of leaning with the right wheel 43R and left wheel 43L contacting the traveling surface.

The process in step S7 is performed even when the coupling pin member 75 is already located in the disengaged position to provide the movable state. Then, the operation proceeds to step S8.

\<Step S8\> Disregard Command Designating Locked State

The controller 101 performs substantially the same process as in step S4. That is, even if a command designating the locked state is inputted to the controller 101 from the state control unit 91, the controller 101 will not carry out the control for a change to the locked state. Then, the operation returns to step S1.

\<Step S9\> Control According to Command from State Control Unit

When a command is inputted to the controller 101 from the state control unit 91, the controller 101 will control the switching mechanism 71 as commanded. Specifically, when a command designating the locked state is inputted to the controller 101, the controller 101 will advance the coupling pin member 75 to the engaged position to set the right wheel 43R and left wheel 43L to the locked state. When a command designating the movable state is inputted to the controller 101, the controller 101 will retract the coupling pin member 75 to the disengaged position to set the right wheel 43R and left wheel 43L to the movable state. Then, the operation proceeds to step S10.

\<Step S10\> Locked State?

The controller 101 reads a detection result from the state sensor 87, and determines whether the coupling pin member 75 is in the disengaged position. Specifically, when the coupling pin member 75 is absent from the disengaged position, the controller 101 determines that the right and left wheels 43 are in the locked state. When the coupling pin member 75 is in the disengaged position, the controller 101 determines that the right and left wheels 43 are not in the locked state.

Because of the construction of the state sensor 87, even when the coupling pin member 75 is absent from the disengaged position, the coupling pin member 75 may not have reached the engaged position, and the right and left wheels 43 may be in the movable state. However, in this step S10, if the coupling pin member 75 is absent from the disengaged position, even if the right and left wheels 43 actually are in the movable state, the process is carried out by regarding the right and left wheels 43 as being in the locked state.

As a result, when it is determined that the locked state is provided, the controller 101 causes the indicator 99 to indicate that the locked state is on, and notify the rider accordingly. Then, the operation proceeds to step S12. Otherwise, the operation proceeds to step S11.

\<Step S11\> At Least Predetermined Speed v?

The controller 101 newly reads a detection result from the speed sensor 83, and determines again whether the vehicle speed corresponds at least to the predetermined speed v. When it is determined as a result that the vehicle speed corresponds at least to the predetermined speed v, the operation proceeds to step S7. Otherwise, the operation returns to step S1.

\<Step S12\> Drive Range?

The controller 101 reads a detection result from the neutral switch 85. When the shift position of the speed changer is not in the neutral range, the controller 101 determines that it is "in the drive range". When the shift position is in the neutral range, the controller 101 determines that it is "not in the drive range". When it is determined as a result that the shift position is in the drive range, the operation proceeds to step S13. Otherwise, the operation returns to step S1.

\<Step S13\> Stop Engine

The controller 101 stops the engine 17. In this specification, the control for stopping the engine 17 is referred to as "stop control" where appropriate. Specifically, in the stop control, the controller 101 controls the ignition stop circuit 96a of CDI unit 96 to stop the engine 17. Consequently, the power for rotating the right and left wheels 43 is no longer generated by the engine 17. Then, the operation returns to step S1.

Thus, the saddle riding type vehicle 1 according to Preferred Embodiment 1 includes the switching mechanism 71 arranged to switch between the movable state and locked state, which allows the vehicle body to switch between a state capable of leaning and a state capable of standing unassisted. The switching mechanism 71 includes the coupling pin member 75 arranged to couple to (mating with) the stabilizer 53 to place the latter in the locked state, and the solenoid 73 arranged to drive the coupling pin member 75, which can maintain the locked state in a stable manner. Therefore, the saddle riding type vehicle 1 can be parked and stored conveniently by switching to the locked state.

Since the solenoid 73 is the self-holding type, after once driving the coupling pin member 75 to the engaged position, the coupling pin member 75 can be maintained in the engaged position even if the current supply is cut. Therefore, power consumption can be minimized during parking and storage.

The saddle riding type vehicle 1 includes the state control unit 91 which enables the rider to select between the locked state and movable state.

Further, when the rider is not seated, even if the state control unit 91 receives a command designating the movable state, the controller 101 disregards this command (steps S1 and S2). This can relieve the rider of a burden of supporting the vehicle body before the rider is seated.

The saddle riding type vehicle 1 includes the state sensor 87 and neutral switch 85, and the controller 101 carries out the stop control when the right and left wheels 43 are in the locked state and a shift position is in the drive range (steps S10, S12, and S13). Consequently, the saddle riding type vehicle 1 can conveniently be prevented from starting or moving forward while the right wheel 43R and left wheel 43L remain in the locked state. In the stop control in step S13, the ignition electric system for the engine 17 is cut off, and thus the controller 101 can stop the engine 17 promptly. Since the controller 101 cuts off the ignition electric system for the engine 17 by controlling the ignition stop circuit 96a operable by the engine stop switch 93, there is no need to provide a new circuit specially designated to carry out the stop control, and thus complication of the construction can be avoided.

The stop control is carried out on condition that a braking operation is carried out and the vehicle speed is less than the predetermined speedy (steps S3, S6, and S13). That is, the stop control is carried out when the saddle riding type vehicle 1 is at a stop or moving very slowly. Thus, there is no possibility that the stop control sharply slows down the saddle riding type vehicle 1. Further, since the stop control is carried out on condition that the rider is seated (step S1 and S13), the stop control can be carried out smoothly.

The saddle riding type vehicle 1 includes the indicator 99 and the controller 101. When the controller 101 determines from a detection result of the state sensor 87 that the right and left wheels 43 are in the locked state, the controller 101 causes the indicator 99 to display that the right and left wheels 43 are in the locked state (step S10). Therefore, the rider can easily understand that the right and left wheels 43 are in the locked state.

The saddle riding type vehicle 1 includes the speed sensor 83 and the controller 101. When the vehicle speed corresponds at least to the predetermined speed v, the controller 101 controls the switching mechanism 71 to set the right and left wheels 43 to the movable state (steps S5 and S7; steps S6 and S7; and steps S11 and S7). Consequently, when the vehicle speed corresponds at least to the predetermined speed v, the vehicle body is capable of leaning and the saddle riding type vehicle 1 can make turns by leaning the vehicle body. Therefore, the rider can travel comfortably. During the series of processes in steps S1 through S13, whether the vehicle speed is equal to or higher than the predetermined speed (steps S5, S6 and S11) is checked a plurality of times, each time in a separate and independent way. Therefore, compared with the cycle of performing the series of processes, variations in the vehicle speed can be surely detected, and the contents of the processes can be changed promptly according to the vehicle speed.

When the vehicle speed corresponds at least to the predetermined speed v, the controller 101 does not carry out the control to switch to the locked state even if a command designating the locked state is inputted from the state control unit 91 (steps S5 and S8; steps S6 and S8; and steps S11 and S8). Consequently, the movable state set in step S7 is maintained regardless of the command inputted to the controller 101 from the state control unit 91. Thus, switching to the locked state can be prevented conveniently when the vehicle speed corresponds at least to the predetermined speed v, even if the rider designates the locked state through the state control unit 91.

The saddle riding type vehicle 1 includes the brake sensor 89, and the controller 101 controls the switching mechanism 71 in compliance with the command inputted from the state control unit 91 when the rider is seated on the seat 15, the vehicle speed is less than the predetermined speed v, and the brakes are operated (steps S1, S3, S6 and S9). When the rider is seated, the rider can support the vehicle body with his or her feet resting on the traveling surface. When the vehicle speed is less than the predetermined speed v and the brakes are operated, the saddle riding type vehicle 1 is at a stop or moving very slowly. In such a case, the rider can select between the locked state and movable state by operating the state control unit 91. When starting, for example, the rider can switch from the locked state to the movable state. When stopping or parking the vehicle, the rider can switch from the movable state to the locked state.

Preferred Embodiment 2

Preferred Embodiment 2 of the present invention will be described hereinafter with reference to the drawings. In Preferred Embodiment 2, the saddle riding type vehicle 1 is characterized by a feature that the stop control is carried out regardless of a braking operation. The saddle riding type vehicle 1 in Preferred Embodiment 2 has substantially the same construction as in Preferred Embodiment 1. An example of operation at the time of parking/storage in Preferred Embodiment 2 also is substantially the same as in Preferred Embodiment 1. Therefore, the construction of the saddle riding type vehicle 1 according to Preferred Embodiment 2 will not be described, and an example of operation at the time of riding the saddle riding type vehicle 1 according to Preferred Embodiment 2 will be described. The same processes as in Preferred Embodiment 1 will be described briefly as appropriate.

Figure 14:
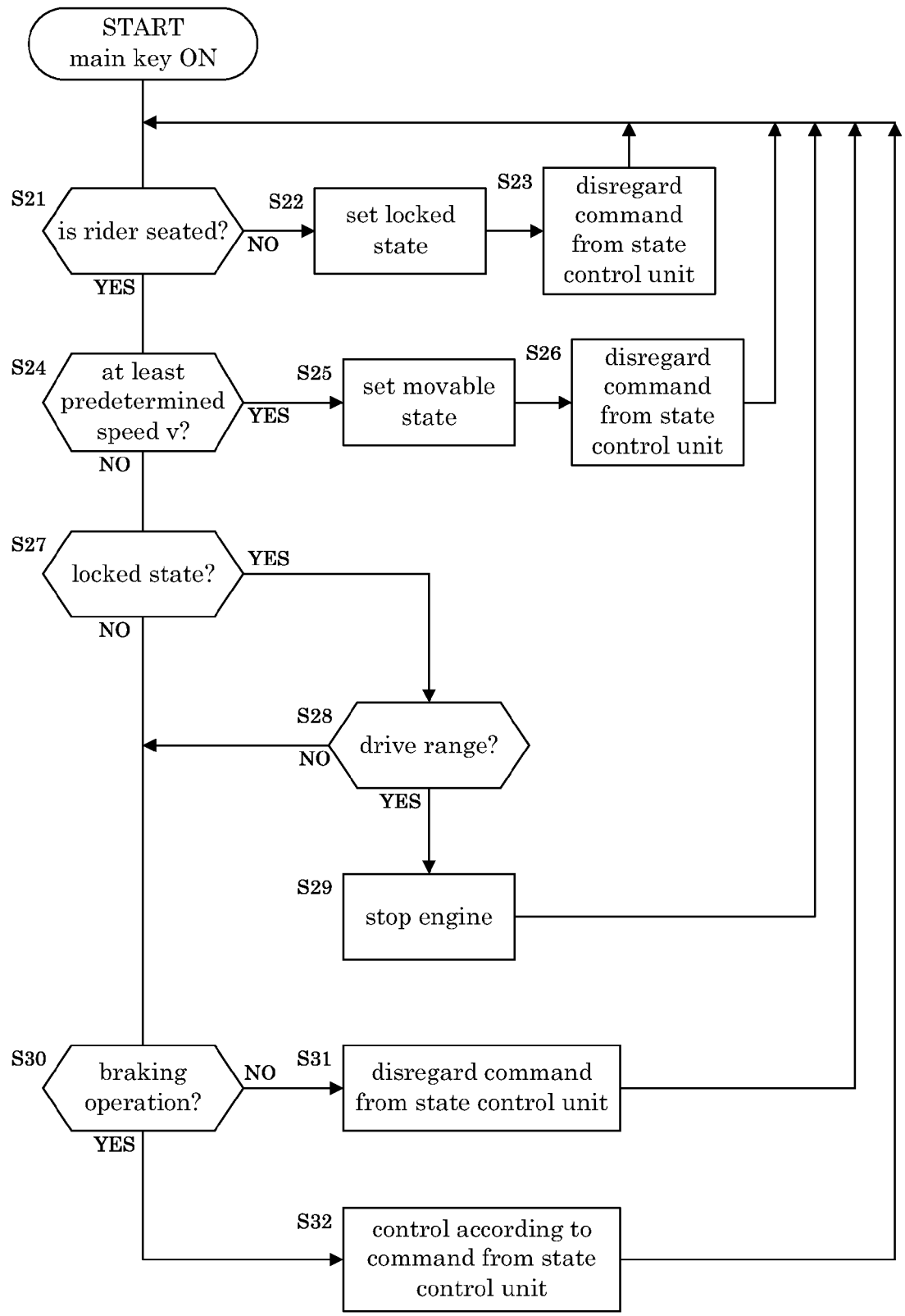
FIG. 14 is a flow chart showing an operating sequence of a saddle riding type vehicle according to Preferred Embodiment 2 of the present invention.

Reference is made to FIG. 14. FIG. 14 is a flow chart showing an operating sequence of the saddle riding type vehicle 1 according to Preferred Embodiment 2. The following description assumes that the rider has already turned the main key ON.

<Step S21> is Rider Seated?

The controller 101 determines based on a detection result from the seating sensor 81 whether the rider is seated. When it is determined that the rider is seated, the operation proceeds to step S24. Otherwise, the operation proceeds to step S22.

<Step S22> Set Locked State

The controller 101 controls the switching mechanism 71 to set the right wheel 43R and left wheel 43L to the locked state. Consequently, the vehicle body stands unassisted. Then, the operation proceeds to step S23.

<Step S23> Disregard Command from State Control Unit

The controller 101 disregards a command from the state control unit 91. That is, even if a command designating the movable state or a command designating the locked state is inputted to the controller 101, the controller 101 will refuse (i.e., disregard) the command inputted from the state control unit 91. Then, the operation returns to step S21.

<Step S24> At Least Predetermined Speed v?

The controller 101 determines based on a detection result from the speed sensor 83 whether the vehicle speed corresponds at least to the predetermined speed v. When it is determined that the vehicle speed corresponds at least to the predetermined speed v, the operation proceeds to step S25. Otherwise, the operation proceeds to step S27.

<Step S25> Set Movable State

The controller 101 controls the switching mechanism 71 to set the right wheel 43R and left wheel 43L to the movable state. Consequently, the vehicle body is now capable of leaning, and the saddle riding type vehicle 1 can make turns by leaning the vehicle body. Then, the operation proceeds to step S26.

<Step S26> Disregard Command from State Control Unit

The controller 101 refuses (disregards) a command inputted from the state control unit 91. Then, the operation returns to step S21.

<Step S27> Locked State?

The controller 101 determines based on a detection result from the state sensor 87 whether the right wheel 43R and left wheel 43L are in the locked state. When it is determined as a result that the locked state has been set, the controller 101 causes the indicator 99 to indicate the locked state, and proceeds to step S28. Otherwise, the controller 101 causes the indicator 99 to indicate the movable state, and proceeds to step S30.

<Step S28> Drive Range?

The controller 101 determines based on a detection result from the neutral switch 85 whether the shift position of the speed changer is in the drive range. When it is determined as a result that the shift position is in the drive range, the operation proceeds to step S29. Otherwise, the operation proceeds to step S30.

<Step S29> Stop Engine

The controller 101 carries out the stop control for stopping the engine 17. Then, the operation returns to step S21.

<Step S30> Braking Operation?

The controller 101 determines based on a detection result from the brake sensor 89 whether a braking operation is carried out. When it is determined as a result that a braking operation is carried out, the operation proceeds to step S32. Otherwise, the operation proceeds to step S31.

<Step S31> Disregard Command from State Control Unit

The controller 101 refuses (disregards) a command inputted from the state control unit 91. Then, the operation returns to step S21.

<Step S32> Control According to Command from State Control Unit

The controller 101 controls the switching mechanism 71 in compliance with a command inputted from the state control unit 91, to switch between the locked state and movable state. Then, the operation returns to step S21.

Thus, with the saddle riding type vehicle 1 according to Preferred Embodiment 2, when the rider is not seated on the seat 15, the switching mechanism 71 is controlled to set the locked state (steps S21 and S22). Consequently, when the rider is not seated, the vehicle body can be maintained in the state of standing unassisted. In this case, the controller 101 does not accept a command from the state control unit 91 (step S23). Therefore, the right wheel 43R and left wheel 43L can be placed reliably in the locked state regardless of a command inputted from the state control unit 91.

Based on a detection result from the speed sensor 83, the controller 101 carries out the stop control on condition that the vehicle speed is less than the predetermined speed v (steps S24 and S29). More particularly, the controller 101 carries out the stop control when the locked state has been set, the shift position is in the drive range, and the vehicle speed is less than the predetermined speed v. This can prevent conveniently the saddle riding type vehicle 1 from starting or moving forward in the locked state. Since the controller 101 carries out the stop control regardless of a brake operation, the saddle riding type vehicle 1 can be prevented with increased reliability from starting or moving forward in the locked state.

Depending on a result of determination whether the locked state has been set, the controller 101 causes the indicator 99 to indicate one of the locked state and movable state (step S27). Therefore, the rider can easily understand the movable state as well as the locked state.

Preferred Embodiment 3

Preferred Embodiment 3 of the present invention will be described hereinafter with reference to the drawings. In Preferred Embodiment 3, the saddle riding type vehicle 1 is characterized by a feature that the switching mechanism 71 and the like are controlled without using detection results relating to a braking operation. The saddle riding type vehicle 1 in Preferred Embodiment 3 has substantially the same construction as in Preferred Embodiment 1 with the exception of the controller 101.

The storage medium of the controller 101 has, stored therein beforehand, besides the predetermined speed v, a value of a predetermined minimal speed vm smaller than the value of the predetermined speed v. The predetermined minimal speed vm may have a value of 3 km/h, for example. However, the predetermined minimal speed vm is not limited to this value, but may be selected as appropriate from a range below the predetermined speed v, such as 0 km/h, 1 km/h, 5 km/h, or 10 km/h, for example.

Next, operation of Preferred Embodiment 3 will be described. An example of operation at the time of parking/storage in Preferred Embodiment 3 is substantially the same as in Preferred Embodiment 1, and will not be described here. An example of operation at the time of riding the vehicle 1 according to Preferred Embodiment 3 will be described. The same processes as in Preferred Embodiment 1 will be described briefly as appropriate.

Figure 15:
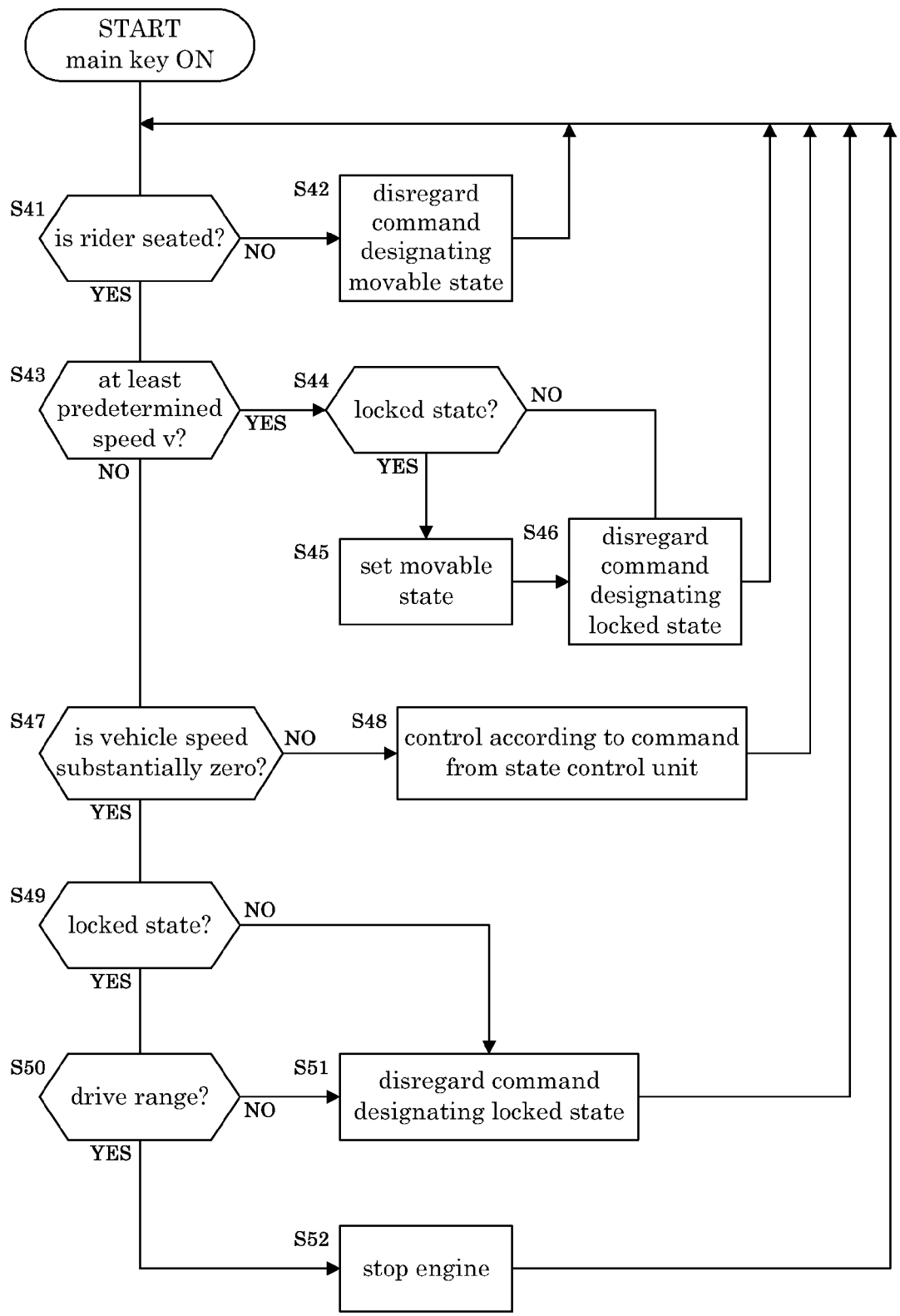
FIG. 15 is a flow chart showing an operating sequence of a saddle riding type vehicle according to Preferred Embodiment 3 of the present invention.

Reference is made to FIG. 15. FIG. 15 is a flow chart showing an operating sequence of the saddle riding type vehicle 1 according to Preferred Embodiment 3. The following description assumes that the rider has already turned the main key ON.

<Step S41> is Rider Seated?

The controller 101 determines based on a detection result from the seating sensor 81 whether the rider is seated. When it is determined that the rider is seated, the operation proceeds to step S43. Otherwise, the operation proceeds to step S42.

<Step S42> Disregard Command Designating Movable State

Even if a command designating the movable state is inputted to the controller 101 from the state control unit 91, the controller 101 will not carry out the control for a change to the movable state. Then, the operation returns to step S41.

<Step S43> At Least Predetermined Speed v?

The controller 101 determines based on a detection result from the speed sensor 83 whether the vehicle speed corresponds at least to the predetermined speed v. When it is determined that the vehicle speed corresponds at least to the predetermined speed v, the operation proceeds to step S44. Otherwise, the operation proceeds to step S47.

<Step S44> Locked State?

The controller 101 determines based on a detection result from the state sensor 87 whether the locked state has been set. When it is determined as a result that the lock state has been set, the operation proceeds to step S45. Otherwise, the operation proceeds to step S46.

<Step S45> Set Movable State

The controller 101 controls the switching mechanism 71 to switch to the movable state. Then, the operation proceeds to step S46.

<Step S46> Disregard Command Designating Locked State

Even if a command designating the locked state is inputted to the controller 101 from the state control unit 91, the controller 101 will not carry out the control for a change to the locked state. Then, the operation returns to step S41.

<Step S47> is Vehicle Speed Substantially Zero?

The controller 101 reads a detection result from the speed sensor 83, and determines whether the vehicle speed is less than the predetermined minimal speed vm. When the result shows that the vehicle speed is less than the predetermined minimal speed vm, the vehicle speed is determined to be substantially zero, and the operation proceeds to step S49. Otherwise, that is when the vehicle speed corresponds at least to the predetermined minimal speed vm, the operation proceeds to step S48.

<Step S48> Control According to Command from State Control Unit

When a command is inputted from the state control unit 91, the controller 101 controls the switching mechanism 71 in compliance with the command. Then, the operation returns to step S41.

<Step S49> Locked State?

The controller 101 determines based on a detection result from the state sensor 87 whether the locked state has been set. When it is determined as a result that the lock state has been set, the operation proceeds to step S50. Otherwise, the operation proceeds to step S51.

<Step S50> Drive Range?

The controller 101 determines based on a detection result from the neutral switch 85 whether the shift position of the speed changer is in the drive range. When it is determined as a result that the shift position is in the drive range, the operation proceeds to step S52. Otherwise, the operation proceeds to step S51.

<Step S51> Disregard Command Designating Locked State

Even if a command designating the locked state is inputted to the controller 101 from the state control unit 91, the controller 101 will not carry out the control for a change to the locked state. Then, the operation returns to step S41.

<Step S52> Stop Engine

The controller 101 carries out the stop control for stopping the engine 17. Then, the operation returns to step S41.

Thus, with the saddle riding type vehicle 1 according to Preferred Embodiment 3, whether the right wheel 43R and left wheel 43L are in the locked state is determined in step S44 before switching the right wheel 43R and left wheel 43L to the movable state. As a result, when the wheels 43 are not in the locked state, the process in step S45 is omitted (not executed). This can avoid an unnecessary supply of current to the solenoid 73.

When the coupling pin member 75 is absent from the disengaged position, the controller 101 determines that the locked state has been set (step S44). Thus, not only when the coupling pin member 75 has reached the engaged position, but also when the coupling pin member 75 has not actually reached the engaged position, the controller 101 moves the coupling pin member 75 to the disengaged position (step S45). Even when the coupling pin member 75 is moved away from the disengaged position by vibration or malfunction, the coupling pin member 75 can be returned promptly to the disengaged position. Therefore, the controller 101 can prevent an inadvertent switching to the locked state, to maintain the movable state with increased reliability.

Based on a detection result from the speed sensor 83 and the predetermined minimal speed vm set beforehand, the controller 101 determines whether the vehicle speed is substantially zero (step S47). This process can conveniently detect that the saddle riding type vehicle 1 is at a stop or is moving very slowly. This can dispense with the process (e.g., the process in step S3 of Preferred Embodiment 1) of determining based on a detection result from the brake sensor 89 whether a brake operation is carried out.

The stop control is carried out on condition that the vehicle speed is substantially zero (steps S47 and S52). Since the stop control hardly changes the vehicle speed of the saddle riding type vehicle 1, the stop control can be carried out very smoothly.

Based on a detection result from the speed sensor 83, the controller 101 carries out the stop control on condition that the vehicle speed is substantially zero (i.e., less than the predetermined minimal speed vm (steps S47 and S52)). More particularly, the controller 101 carries out the stop control when the locked state has been set, the shift position is in the drive range, and the vehicle speed is less than the predetermined minimal speed vm. This can conveniently prevent the saddle riding type vehicle 1 from starting or moving forward in the locked state. Since the controller 101 carries out the stop control regardless of a brake operation, the saddle riding type vehicle 1 can be prevented with increased reliability from starting or moving forward while the right wheel 43R and left wheel 43L remain in the locked state.

Preferred Embodiment 4

Preferred Embodiment 4 of the present invention will be described hereinafter with reference to the drawings. In Preferred Embodiment 4, the saddle riding type vehicle 1 is characterized by a feature that the stop control is carried out even when the shift position is not in the drive range. The saddle riding type vehicle 1 in Preferred Embodiment 4 has substantially the same construction as in Preferred Embodiment 1. An example of operation at the time of parking/storage in Preferred Embodiment 4 also is substantially the same as in Preferred Embodiment 1, but an example of operation at the time of riding the vehicle 1 according to Preferred Embodiment 4 is different from that in Preferred Embodiment 1. Thus, the construction and parking/storage of the saddle riding type vehicle 1 in Preferred Embodiment 4 will not be described here. An example of operation at the time of riding the vehicle 1 according to Preferred Embodiment 4 will be described. The same processes as in Preferred Embodiment 1 will be described briefly as appropriate.

Figure 16:
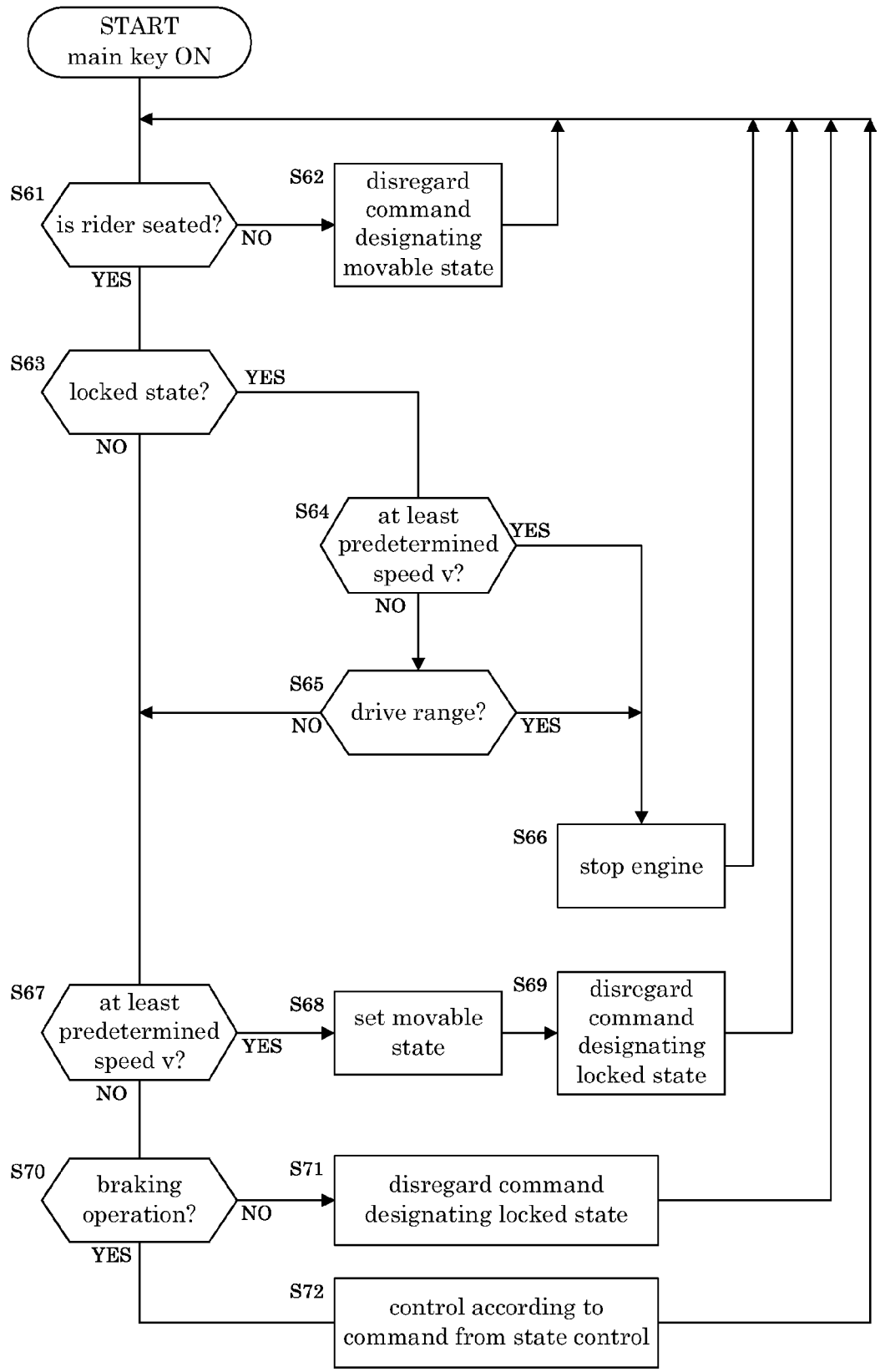
FIG. 16 is a flow chart showing an operating sequence of a saddle riding type vehicle according to Preferred Embodiment 4 of the present invention.

Reference is made to FIG. 16. FIG. 16 is a flow chart showing an operating sequence of the saddle riding type vehicle 1 according to Preferred Embodiment 4. The following description assumes that the rider has already turned the main key ON.

<Steps S61 and S62>

When it is determined based on a detection result from the seating sensor 81 that the rider is not seated, even if a command designating the movable state is inputted to the controller 101 from the state control unit 91, the controller 101 will not carry out the control for a change to the movable state. That is, the controller 101 refuses (disregards) the command designating the movable state in step S62. Then, the operation returns to step S61. When the controller 101 determines that the rider is seated, the operation proceeds to step S63.

<Steps S63-S66>

Based on detection results from the state sensor 87, speed sensor 83, and neutral switch 85, the controller 101 carries out the stop control <Step S66> when the vehicle speed corresponds at least to the predetermined speed v and the locked state has been set <Step S64>, or when the shift position is in the drive range and the locked state has been set <Step S65>. Then, the operation returns to step S61. Otherwise, the operation proceeds to step S67.

<Steps S67-S69>

When a detection result from the speed sensor 83 shows the vehicle speed corresponding at least to the predetermined speed v in step S67, the controller 101 controls the switching mechanism 71 to set the right wheel 43R and left wheel 43L to the movable state in step S68. Further, even if a command designating the locked state is inputted to the controller 101 from the state control unit 91, the controller 101 will refuse (i.e. disregard) this command instep S69. Then, the operation returns to step S61. On the other hand, when the vehicle speed is less than the predetermined speed v, the operation proceeds to step S70.

<Steps S70-S72>

When a detection result from the brake sensor 89 shows that a braking operation is carried out in step S70, the controller 101 controls the switching mechanism 71 in compliance with a command inputted from the state control unit 91 in step S72. Then, the operation returns to step S61. On the other hand, when a braking operation is not carried out, even if a command designating the locked state is inputted from the state control unit 91, the controller 101 will not carry out a control for a change to the locked state in step S71. And the operation returns to step S61.

Thus, with the saddle riding type vehicle 1 according to Preferred Embodiment 4, the stop control is carried out whenever the shift position enters the drive range while the right wheel 43R and left wheel 43L remain in the locked state, and this can reliably prevent the saddle riding type vehicle 1 from running with the right and left wheels 43 in the locked state. Further, the stop control is carried out also when the vehicle speed becomes the predetermined speed v or higher while the right and left wheels 43 remain in the locked state. This can reliably prevent the saddle riding type vehicle 1 from starting or moving forward when the right and left wheels 43 are in the locked state.

Preferred Embodiment 5

Preferred Embodiment 5 of the present invention will be described hereinafter with reference to the drawings. In Preferred Embodiment 5, the saddle riding type vehicle 1 is characterized by a feature that the switching mechanism 71 and the like are controlled without using detection results from the neutral switch 85. The saddle riding type vehicle 1 in Preferred Embodiment 5 has substantially the same construction as in Preferred Embodiment 1. An example of operation at the time of parking/storage in Preferred Embodiment 5 also is substantially the same as in Preferred Embodiment 1, but an example of operation at the time of riding the vehicle 1 according to Preferred Embodiment 5 is different from that in Preferred Embodiment 1. Thus, the construction and parking/storage of the saddle riding type vehicle 1 in Preferred Embodiment 5 will not be described here. An example of operation at the time of riding the vehicle 1 according to Preferred Embodiment 5 will be described. The same processes as in Preferred Embodiment 1 will be described briefly as appropriate.

Figure 17:
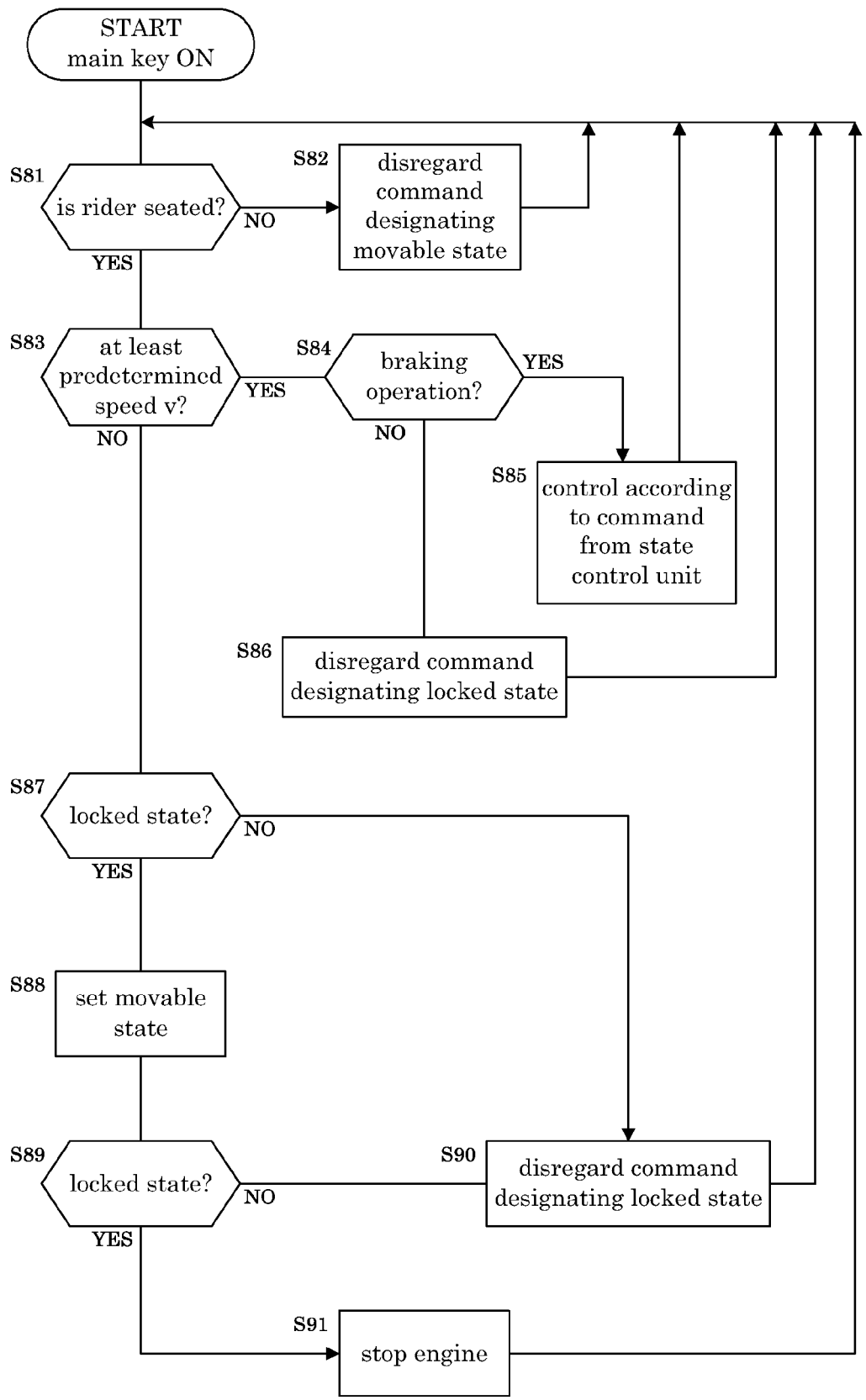
FIG. 17 is a flow chart showing an operating sequence of a saddle riding type vehicle according to Preferred Embodiment 5 of the present invention.

Reference is made to FIG. 17. FIG. 17 is a flow chart showing an operating sequence of the saddle riding type vehicle 1 according to Preferred Embodiment 5. The following description assumes that the rider has already turned the main key ON.

<Steps S81 and S82>

When the controller 101 determines based on a detection result from the seating sensor 81 that the rider is not seated, even if a command designating the movable state is inputted to the controller 101 from the state control unit 91, the controller 101 will not carry out the control for a change to the movable state in step S82. Then, the operation returns to step S81. When the controller 101 determines that the rider is seated, the operation proceeds to step S83.

<Steps S83-S86>

When, based on detection results from the speed sensor 83 and brake sensor 89, the vehicle speed is less than the predetermined speedy and a braking operation is carried out in step S84, the controller 101 controls the switching mechanism 71 in compliance with a command inputted from the state control unit 91 in step S85. Then, the operation returns to step S81. When the vehicle speed is less than the predetermined speed v and a braking operation is not carried out, even if a command designating the locked state is inputted from the state control unit 91, the controller 101 will disregard this command in step S86. Then, the operation returns to step S81. When the vehicle speed corresponds at least to the predetermined speed v, the operation proceeds to step S87.

<Steps S87-S91>

When a detection result from the state sensor 87 shows that the locked state has not been set, even if a command designating the locked state is inputted to the controller 101 from the state control unit 91, the controller 101 will disregard this command. Then, the operation returns to step S81 (step S90). On the other hand, when the locked state has been set, the controller 101 will carry out the control to switch to the movable state (step S88). Further, the controller 101 newly acquires a detection result from the state sensor 87, and determines again whether the locked state has been set (step S89). The process in step S88 is, in particular, hereinafter called the "state change control".

When it is determined in step S89 that the locked state is not set, that is, when a switching has been made to the movable state, even if a command designating the locked state is inputted to the controller 101 from the state control unit 91, the controller 101 will disregard this command. Then, the operation returns to step S81 (step S90). The stop control is carried out when it is determined in step S89 that the locked state has been set, that is, when a switching has not been made to the movable state although the control for switching to the movable state has been carried out in step S88. Then, the operation returns to step S81 (step S91).

Thus, with the saddle riding type vehicle 1 according to Preferred Embodiment 5, the stop control is carried out when the vehicle speed corresponds at least to the predetermined speed v and the locked state has been set (S83, S87, S89, and S91). In other words, the controller 101 carries out the stop control regardless of a shift position. This can dispense with the process of determining based on a detection result from the neutral switch 85 whether the shift position is in the drive range. The controller 101 can carry out the stop control conveniently even with a saddle riding type vehicle 1 without the neutral range (that is to say the shift position is always in the drive range), for example.

When it is determined based on detection results from the speed sensor 83 and state sensor 87 that the vehicle speed corresponds at least to the predetermined speed v and the locked state has been set, the controller 101 carries out the state change control in advance of the stop control. Specifically, the controller 101 controls the switching mechanism 71 to switch the right and left wheels 43 to the movable state (step S88). This allows the saddle riding type vehicle 1 to continue running without stopping the engine 17.

Based on a detection result from the state sensor 87, the controller 101 carries out the state change control and checks whether a switching has been made to the movable state (step S89). The stop control is carried out only when a switching has not been made to the movable state (step S91). This can reliably avoid a situation in which the saddle riding type vehicle 1 runs with the right and left wheels 43 in the locked state.

The present invention is not limited to the foregoing preferred embodiments, but may be modified as described in the following paragraphs.

In each of the foregoing preferred embodiments, the solenoid 73 preferably is the self-holding type. The present invention is not limited to this. The solenoid 73 need not be the self-holding type as long as the coupling pin member 75 can at least be maintained in the engaged position.

In each of the foregoing preferred embodiments, the state sensor 87 preferably is arranged to detect whether the coupling pin member 75 is located in the disengaged position. The present invention is not limited to this. The state sensor 87 may, for example, be modified to detect whether the coupling pin member 75 is located in the engaged position. Further, the state sensor 87 may be modified to detect presence or absence of the coupling pin member 75 in/from both the disengaged position and engaged position.

In each of the foregoing preferred embodiments, the controller 101 preferably causes the indicator 99 to indicate the locked state and movable state of the right and left wheels 43. The present invention is not limited to this. For example, the state sensor 87 may provide a detection result directly to the indicator 99, and based on the detection result inputted from the state sensor 87, the indicator 99 may indicate the locked state or otherwise.

In each of the foregoing preferred embodiments, the braking operation detected by the brake sensor 89 may preferably be an operation of the rider to grip a brake lever or to depress a brake pedal, or both.

In each of the foregoing preferred embodiments, the vehicle speed detected by the speed sensor 83 may be a wheel speed of the right and left wheels 28, a wheel speed of the right and left wheels 43, or both.

In each of the foregoing preferred embodiments, the saddle riding type vehicle 1 preferably includes the neutral switch 85. The present invention is not limited to this. Instead of the neutral switch 85, a gear position sensor may be provided to detect whether a shift position is neutral, parking, the first speed, second speed, or others. The gear position sensor also can detect conveniently whether the shift position is in the drive range.

In each of the foregoing preferred embodiments, the ignition stop circuit 96a is operable by the engine stop switch 93 and also by the controller 101. The present invention is not limited to this. For example, a circuit may be provided separately from the ignition stop circuit 96a to be operable only by the controller 101 to cut off the ignition electric system for the engine 17, and the controller 101 may be modified to control this circuit for the stop control. Further, the stop control may be changed to a control which stops fuel supply to the engine 17.

In each of the foregoing preferred embodiments, the indicator 99 serves to communicate information to the rider. The present invention is not limited to this. For example, an indicator may be used to communicate information to vehicles or people close to the saddle riding type vehicle 1.

In each of the foregoing preferred embodiments, the switching mechanism 71 is preferably engageable with the stabilizer 53. The present invention is not limited to this. The switching mechanism 71 may, for example, be modified to engage with and disengage from at least one of the right rear arm. 41R and left rear arm. 41L, to switch between the locked state and movable state. Or the switching mechanism 71 may be modified to engage with and disengage from the support mechanism such as the right lower arm 21R provided for the right and left wheels 28, to switch between the locked state and movable state.

Each of the foregoing preferred embodiments shows the four-wheeled vehicle preferably including the right and left wheels 28 and 43 at the front and rear of the vehicle body. The vehicle may be changed to a three-wheeled vehicle having one wheel at the front or rear.

The preferred embodiments and the modifications described above may be further varied as appropriate by replacing or combining certain components with other modifications.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A saddle riding type vehicle capable of making turns by leaning a vehicle body, the saddle riding type vehicle comprising:
   a support mechanism arranged to support at least a pair of wheels provided at opposite sides of the vehicle body to be movable up and down relative to the vehicle body;
   a switching mechanism arranged to switch between a movable state in which the pair of wheels are permitted to move up and down and a locked state in which the pair of wheels are restricted from moving up and down; and
   a controller arranged and programmed to control the switching mechanism; wherein
   the support mechanism includes at least one shock absorber to absorb impacts from a traveling surface; and
   the switching mechanism includes:
     a coupling pin member arranged to engage with a recess of the support mechanism to restrict movement of the support mechanism relative to the vehicle body thereby setting the locked state, and to disengage from the support mechanism to permit movement of the support mechanism relative to the vehicle body thereby setting the movable state; and
     a solenoid fixed to the vehicle body and arranged to drive the coupling pin member to engage with and to disengage from the support mechanism;
     the solenoid is arranged to insert the coupling pin member into the recess of the support mechanism when the solenoid advances the coupling pin member to engage with the support mechanism; and
     the solenoid is arranged to withdraw the coupling pin member from the recess of the support mechanism when the solenoid retracts the coupling pin member to disengage with the support mechanism.

2. The vehicle according to claim 1, further comprising:
   a seating detecting device arranged to detect whether a rider is seated on a seat; and
   a state control unit arranged to receive commands from the rider designating the locked state and the movable state; wherein
   the controller is arranged and programmed, when it is determined based on a detection result from the seating detecting device that the rider is absent from the seat, to withhold a control to cause the switching mechanism to switch to the movable state even if a command designating the movable state is inputted from the state control unit.

3. The vehicle according to claim 2, wherein the controller is arranged and programmed, when it is determined based on the detection result from the seating detecting device that the rider is absent from the seat, to control the switching mechanism to switch to the locked state regardless of a command inputted from the state control unit.

4. The vehicle according to claim 1, further comprising:
a state detecting device arranged to detect which of the locked state and the movable state has been set; and
a shift detecting device arranged to detect whether a shift position of a speed changer is in a drive range; wherein
the controller is arranged and programmed to carry out a stop control to stop an engine when it is determined, based on detection results from the state detecting device and the shift detecting device, that the locked state has been set and the shift position is in the drive range.

5. The vehicle according to claim 4, wherein the stop control is arranged to cut off an ignition electric system for the engine.

6. The vehicle according to claim 4, further comprising an indicator arranged to indicate, based on a detection result from the state detecting device, that the locked state has been set.

7. The vehicle according to claim 4, further comprising a speed detecting device arranged to detect a vehicle speed, wherein the controller is arranged and programmed to control the switching mechanism to set the movable state when it is determined based on a detection result from the speed detecting device that the vehicle speed corresponds at least to a predetermined speed.

8. The vehicle according to claim 7, wherein:
the state detecting device is arranged to detect whether the coupling pin member is in a disengaged position disengaged from the support mechanism; and
the controller is arranged and programmed, when it is determined based on the detection results from the speed detecting device and the state detecting device that the vehicle speed corresponds at least to a predetermined speed and the coupling pin member is spaced away from the disengaged position, to return the coupling pin member to the disengaged position.

9. The vehicle according to claim 7, wherein the controller is arranged and programmed, when it is determined based on the detection result from the speed detecting device that the vehicle speed corresponds at least to the predetermined speed, to withhold a control to cause the switching mechanism to switch to the locked state even if a command designating the locked state is inputted from the state control unit.

10. The vehicle according to claim 7, further comprising a brake detecting device arranged to detect a braking operation, wherein the controller is arranged and programmed to control the switching mechanism in compliance with a command inputted from the state control unit when it is determined, based on the detection results from the seating detecting device, the speed detecting device, and the brake detecting device, that the rider is seated on the seat, the vehicle speed is less than the predetermined speed, and the braking operation is carried out.

11. The vehicle according to claim 4, further comprising:
a speed detecting device arranged to detect a vehicle speed; and
a brake detecting device arranged to detect a braking operation; wherein
the controller is arranged and programmed to carry out the stop control on a condition that, based on detection results from the speed detecting device and the brake detecting device, the vehicle speed is less than a predetermined speed and the braking operation is carried out.

12. The vehicle according to claim 4, further comprising a speed detecting device arranged to detect a vehicle speed, wherein the controller is arranged and programmed to carry out the stop control on a condition that, based on a detection result from the speed detecting device, the vehicle speed is substantially zero.

13. The vehicle according to claim 1, further comprising a speed detecting device arranged to detect a vehicle speed, wherein the controller is arranged and programmed to control the switching mechanism to set the movable state when it is determined based on a detection result from the speed detecting device that the vehicle speed corresponds at least to a predetermined speed.

14. The vehicle according to claim 1, further comprising:
a seating detecting device arranged to detect whether a rider is seated on a seat;
a speed detecting device arranged to detect a vehicle speed;
a brake detecting device arranged to detect a braking operation; and
a state control unit arranged to receive commands designating the locked state and the movable state from the rider; wherein
the controller is arranged and programmed to control the switching mechanism in compliance with a command inputted from the state control unit when it is determined, based on detection results from the seating detecting device, the speed detecting device, and the brake detecting device, that the rider is seated on the seat, the vehicle speed is less than a predetermined speed, and the braking operation is carried out.

15. The vehicle according to claim 1, further comprising:
a seating detecting device arranged to detect whether a rider is seated on a seat;
a speed detecting device arranged to detect a vehicle speed; and
a state control unit arranged to receive commands designating the locked state and the movable state from the rider; wherein
the controller is arranged and programmed to control the switching mechanism in compliance with a command inputted from the state control unit when it is determined, based on detection results from the seating detecting device and the speed detecting device, that the rider is seated on the seat and the vehicle speed is substantially zero.

16. The vehicle according to claim 1, wherein:
the recess of the support mechanism is included in a stabilizer of the support mechanism; and
the stabilizer of the support mechanism is rotatable relative to the vehicle body.

17. The vehicle according to claim 16, wherein rotation of the stabilizer is restricted when the coupling pin member is engaged with the stabilizer of the support mechanism.

* * * * *